United States Patent
Chen et al.

(10) Patent No.: US 9,750,046 B2
(45) Date of Patent: Aug. 29, 2017

(54) METHODS AND APPARATUS OF OBTAINING SCHEDULING INFORMATION OF DATA CHANNEL

(71) Applicants: Hua-Min Chen, Beijing (CN); Pei-Kai Liao, Nantou County (TW); Xiangyang Zhuang, Lake Zurich, IL (US)

(72) Inventors: Hua-Min Chen, Beijing (CN); Pei-Kai Liao, Nantou County (TW); Xiangyang Zhuang, Lake Zurich, IL (US)

(73) Assignee: MEDIATEK SINGAPORE PTE. LTD., Singapore (SG)

(*) Notice: Subject to any disclaimer, the term of this patent is extended or adjusted under 35 U.S.C. 154(b) by 10 days.

(21) Appl. No.: 14/779,176

(22) PCT Filed: Apr. 3, 2014

(86) PCT No.: PCT/CN2014/074741
§ 371 (c)(1),
(2) Date: Sep. 22, 2015

(87) PCT Pub. No.: WO2014/161504
PCT Pub. Date: Oct. 9, 2014

(65) Prior Publication Data
US 2016/0050687 A1     Feb. 18, 2016

(30) Foreign Application Priority Data
Apr. 3, 2013   (CN) .......................... 2013 1 0116266

(51) Int. Cl.
*H04W 4/00*   (2009.01)
*H04W 72/12*   (2009.01)
(Continued)

(52) U.S. Cl.
CPC ....... *H04W 72/1289* (2013.01); *H04L 5/0044* (2013.01); *H04L 5/0091* (2013.01); *H04W 88/02* (2013.01)

(58) Field of Classification Search
CPC .............. H04W 72/1289; H04W 88/02; H04L 5/0044; H04L 5/0053; H04L 5/0091
See application file for complete search history.

(56) References Cited

U.S. PATENT DOCUMENTS 8,155,069 B2 * 4/2012 Chun .................... H04L 5/0042
370/329
9,185,716 B2 * 11/2015 Papasakellariou ...... H04L 5/003
(Continued)

FOREIGN PATENT DOCUMENTS

| CN | 102170703 | 8/2011 |
|---|---|---|
| CN | 102594537 | 7/2012 |
| CN | 102857325 | 1/2013 |

OTHER PUBLICATIONS

International Search Report dated Jun. 30, 2014, issued in application No. PCT/CN2014/074741.

*Primary Examiner* — Kevin Mew
(74) *Attorney, Agent, or Firm* — McClure, Qualey & Rodack, LLP

(57) ABSTRACT

A method includes: determining a first set of radio resources by decoding a dynamic indicator channel, wherein the dynamic indicator channel indicates a location of the first set of radio resources detecting a physical control channel in the determined first set of radio resources; and obtaining scheduling information of a data channel that carries a message from the decoded physical control channel.

32 Claims, 21 Drawing Sheets

(51) Int. Cl.
*H04L 5/00* (2006.01)
*H04W 88/02* (2009.01)

(56) References Cited

U.S. PATENT DOCUMENTS

| | | | |
|---|---|---|---|
| 9,345,021 B2* | 5/2016 | Nory | H04L 5/0053 |
| 9,635,644 B2* | 4/2017 | Chen | H04W 72/04 |
| 2007/0036067 A1 | 2/2007 | Zhang et al. | |
| 2011/0038303 A1* | 2/2011 | Ji | H04L 5/0053 |
| | | | 370/315 |
| 2011/0038353 A1* | 2/2011 | Miki | H04J 11/0026 |
| | | | 370/335 |
| 2011/0170496 A1* | 7/2011 | Fong | H04L 5/0053 |
| | | | 370/329 |
| 2011/0249633 A1* | 10/2011 | Hong | H04L 5/0053 |
| | | | 370/329 |
| 2012/0294252 A1* | 11/2012 | Kwon | H04L 5/0053 |
| | | | 370/329 |
| 2013/0010964 A1* | 1/2013 | Fong | H04L 5/0053 |
| | | | 380/277 |
| 2013/0114528 A1* | 5/2013 | Chen | H04L 5/0053 |
| | | | 370/329 |
| 2013/0201926 A1* | 8/2013 | Nam | H04L 1/1685 |
| | | | 370/329 |
| 2013/0308557 A1* | 11/2013 | Gao | H04W 72/0406 |
| | | | 370/329 |
| 2013/0322392 A1* | 12/2013 | Abe | H04L 5/00 |
| | | | 370/329 |
| 2014/0050191 A1* | 2/2014 | Kim | H04L 5/001 |
| | | | 370/329 |
| 2014/0071918 A1* | 3/2014 | Park | H04W 72/14 |
| | | | 370/329 |
| 2014/0071934 A1* | 3/2014 | Frenne | H04L 5/001 |
| | | | 370/330 |
| 2014/0105057 A1 | 4/2014 | Liu | |
| 2014/0211767 A1* | 7/2014 | Lunttila | H04W 72/1289 |
| | | | 370/336 |
| 2015/0358985 A1* | 12/2015 | Chen | H04W 72/12 |
| | | | 370/328 |
| 2016/0007371 A1* | 1/2016 | Pietraski | H04W 72/1263 |
| | | | 370/315 |
| 2016/0080963 A1* | 3/2016 | Marinier | H04L 5/0053 |
| | | | 370/252 |

* cited by examiner

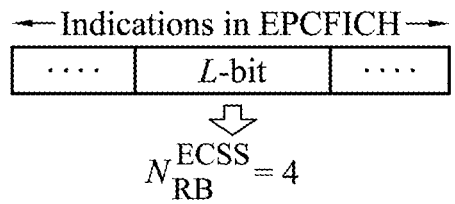
FIG. 7A
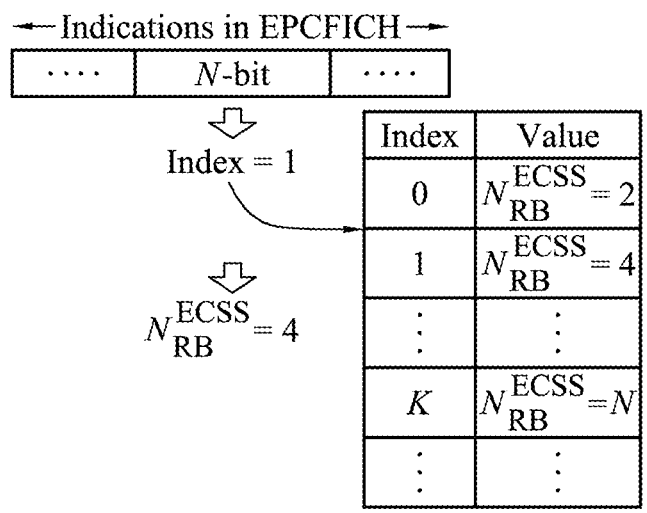
FIG. 7B
$N_{RB}^{ECSS} = N$
FIG. 7C

←Indications in EPCFICH→

| .... | L-bit | .... |

⇩

$N_{\text{offset}}^{\text{ECSS}} = 3$

←Indications in EPCFICH→

| .... | N-bit | .... |

$N_{\text{offset}}^{\text{ECSS}} = 3$ $N_{\text{offset}}^{\text{ECSS}} = f\left(N_{\text{RB}}^{\text{ECSS}}, N_{\text{RB}}^{\text{DL}}, N_{\text{ID}}^{\text{cell}}, n_{\text{sf}}\right)$

⇩

$N_{\text{offset}}^{\text{ECSS}} = 3$

METHODS AND APPARATUS OF OBTAINING SCHEDULING INFORMATION OF DATA CHANNEL

CROSS REFERENCE TO RELATED APPLICATIONS

This application is a National Phase of PCT Application No. PCT/CN2014/074741, filed on Apr. 3, 2014, which claims the benefit of CN Application No. 201310116266.8 filed 2013 Apr. 3, the entire contents of which are hereby incorporated by reference.

TECHNICAL FIELD

Aspects of the present invention relate generally to wireless communications systems, and more particularly to methods and apparatuses of obtaining scheduling information of a data channel.

BACKGROUND

In 3GPP LTE Release 11 system, one feature is an enhanced physical downlink control channel (EPDCCH). Compared to the legacy physical downlink control channel (PDCCH), the main advantages of the EPDCCH are that it is
  able to support increased control channel capacity;
  able to support frequency-domain inter-cell interference coordination (ICIC);
  able to achieve improved spatial reuse of a control channel resource;
  able to support beamforming and/or diversity;
  able to operate on the new carrier type (NCT) and in MBSFN subframes;
  able to coexist on the same carrier as legacy user equipment (UE).

In Release 11, the main design for the EPDCCH focuses on configuring an enhanced UE-specific search space (EUSS) in the EPDCCH detected by the UEs. Except for the predefined rules and parameters, all necessary configurations are from radio resource control (RRC) or higher layers. Further, the EPDCCH may not work without legacy PDCCH because no common search space is defined for the EPDCCH.

Up to now, it's an open issue to support the EPDCCH in a stand-alone operation, especially in case of a stand-alone NCT. In Release 12, the related topic in the 2nd phase of NCT is that NCT could operate independently without being always associated with a legacy carrier. In this case, there is no legacy PDCCH, and all control signaling are assumed to be transmitted in EPDCCH. Then, a stand-alone EPDCCH must be designed. In other words, an enhanced common search space (ECSS) should be supported in EPDCCH by default and without RRC or a higher layer signaling to schedule the common control message. Even in the case of a non stand-alone NCT, it's more efficient that UEs can receive common control information directly, and this can relieve the traffic load in the primary cell or macro cell.

SUMMARY

A detailed description is given in the following embodiments with reference to the accompanying drawings.
Methods and apparatuses of obtaining scheduling information of a data channel are provided.

In one novel aspect, a method for obtaining scheduling information of a data channel is provided. The method includes: determining a first set of radio resources by decoding a dynamic indicator channel, wherein the dynamic indicator channel indicates a location of the first set of radio resources; detecting a physical control channel on the determined first set of radio resources; and obtaining scheduling information of a data channel that carries a message from the detected physical control channel.

In another novel aspect, an apparatus for obtaining scheduling information of a data channel is provided. The apparatus operates as User Equipment (UE), and comprises an RF signal processing device and a processor. The processor is coupled to the RF signal processing device and configured to determine a first set of radio resources by decoding a dynamic indicator channel, wherein the dynamic indicator channel indicates a location of the first of radio resource, detect a physical control channel on the determined first set of radio resources; and obtain scheduling information of a data channel that carries a message from the decoded physical control channel.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein:

FIGS. 7A-7D are schematic diagrams illustrating four example for determining the size of resources for the common EPDCCH set according to one embodiment of the present invention.

DETAILED DESCRIPTION

Figure 1:
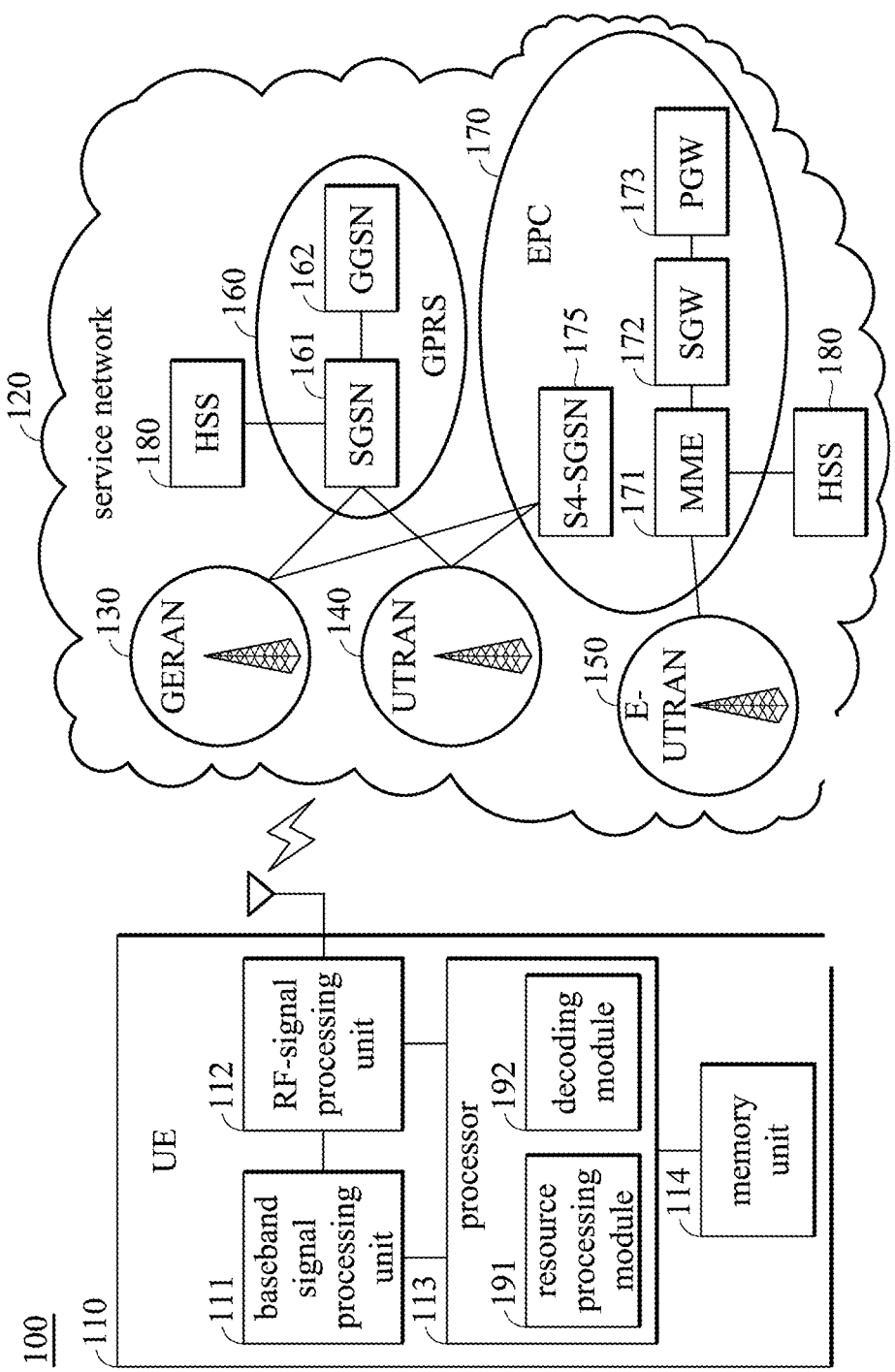
FIG. 1 is a block diagram of a mobile communications system according to an embodiment of the invention.

Several exemplary embodiments of the present disclosure are described with reference to FIGS. 1 through 17, which generally relate to a method and an apparatus of obtaining scheduling information of a data channel. It is to be understood that the following disclosure provides various embodiments as examples for implementing different features of the present disclosure. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

The following description is of the best-contemplated mode of carrying out the invention. This description is made for the purpose of illustrating the general principles of the invention and should not be taken in a limiting sense. Note that the 3GPP specifications described herein are used to teach the spirit of the invention, and the invention is not limited thereto.

To further enhance the frequency and the power transmission performance, the new carrier type is one of the techniques for providing a smooth transition from legacy LTE systems. In the LTE Release 11 system, dedicated data channels can be scheduled by downlink scheduling information (DL scheduling information) or uplink grant information (uplink grant) in the enhanced physical downlink control channel (EPDCCH). However, new mechanisms have to be designed, e.g. to support scheduling of broadcast common messages by the EPDCCH, to enable LTE Release 12 system to support stand-alone operation of the new carrier type. Embodiments of the present invention provide methods and apparatuses to support the stand-alone operation in new carrier type.

FIG. 1 is a block diagram of a mobile communications system 100 according to an embodiment of the invention. The system 100 comprises User Equipment (UE) 110, and a service network 120. The UE 110 may be a mobile communications device, such as a cellular phone, a smartphone, a modem processor, a data card, a laptop stick, a mobile hotspot, an USB modem, a tablet, or others.

The UE 110 may comprise at least a baseband signal processing unit 111, a radio frequency (RF) signal processing unit 112, a processor 113, a memory unit 114, and an antenna module comprising at least one antenna for transmission/reception. Note that, in order to clarify the concept of the invention, FIG. 1 presents a simplified block diagram in which only the elements relevant to the invention are shown. However, the invention should not be limited to what is shown in FIG. 1.

The RF signal processing unit 112 may receive RF signals via the antenna and convert the received RF signals to baseband signals to be processed by the baseband signal processing unit 111, or receive baseband signals from the baseband signal processing unit 111 and convert the received baseband signals to RF signals to be transmitted to a peer communications apparatus. The RF signal processing unit 112 may also comprise an analog front end (AFE) module. The RF signal processing unit 112 may comprise a plurality of hardware elements to perform radio frequency conversion. For example, the RF signal processing unit 112 may comprise a power amplifier, a mixer, or others.

The baseband signal processing unit 111 may further process the baseband signals to obtain information or data transmitted by the peer communications apparatus. The baseband signal processing unit 111 may also comprise a plurality of hardware elements to perform baseband signal processing. The baseband signal processing may comprise analog-to-digital conversion (ADC)/digital-to-analog conversion (DAC), gain adjustment, modulation/demodulation, encoding/decoding, and so on.

The processor 113 may control the operations of the baseband signal processing unit 111 and the RF signal processing unit 112. According to an embodiment of the invention, the processor 113 may also be arranged to execute the program codes of the software module(s) of the corresponding baseband signal processing unit 111 and/or the RF signal processing unit 112. The program codes accompanied with specific data in a data structure may also be referred to as a processor logic unit or a stack instance when being executed. Therefore, the processor 113 may be regarded as being comprised of a plurality of processor logic units, each for executing one or more specific functions or tasks of the corresponding software module(s), for example, the processor 113 includes a resource processing module 191 for determining a set of radio resources according to a dynamic indicator or a predefined rule, and a decoding module 192 for decoding control channels within a set of radio resources, for example the ECSS, etc. The memory unit 114 may store the software and firmware program codes, system data, user data, etc. of the UE 110. The memory unit 114 may be a volatile memory, e.g. a Random Access Memory (RAM), or a non-volatile memory, e.g. a flash memory, Read-Only Memory (ROM), or hard disk, or any combination thereof. In an embodiment of the invention, the memory unit 114 stores the system information which the UE 110 collected previously.

According to an embodiment of the invention, the RF signal processing unit 112 and the baseband signal processing unit 111 may be collectively regarded as a radio module capable of communicating with a wireless network providing wireless communications services in compliance with a predetermined Radio Access Technology (RAT). Note that, in some embodiments of the invention, the UE 110 may further be extended to comprise more than one antenna and/or more than one radio module, and the invention should not be limited to what is shown in FIG. 1.

In addition, in some embodiments of the invention, the processor 113 may be configured inside of the baseband signal processing unit 111, or the UE 110 may comprise another processor configured inside of the baseband signal processing unit 111. Thus the invention should not be limited to the architecture shown in FIG. 1.

The service network 120 may comprise a GSM EDGE Radio Access Network (GERAN) 130, a Universal Terrestrial Radio Access Network (UTRAN) 140, an Evolved UTRAN (E-UTRAN) 150, a General Packet Radio Service (GPRS) subsystem 160 and an Evolved Packet Core (EPC) subsystem 170. The GERAN 130, UTRAN 140 and E-UTRAN 150 may be in communications with the GPRS subsystem 160 or the EPC subsystem 170, wherein the GERAN 130, UTRAN 140 and E-UTRAN 150 allow connectivity between the UE 110 and the GPRS subsystem 160 or the EPC subsystem 170 by providing the functionality of wireless transmission and reception to and from the UE 110 for the GPRS subsystem 160 or the EPC subsystem 170, and the GPRS subsystem 160 or the EPC subsystem 170 signals the required operation to the GERAN 130, UTRAN 140 and E-UTRAN 150 for providing wireless services to the UE 110. The GERAN 130, UTRAN 140 and E-UTRAN 150 may contain one or more base stations (also called NodeBs or eNodeBs) and Radio Network Controllers (RNCs). Specifically, the GPRS subsystem 160 includes a Serving GPRS (General Packet Radio Service) Support Node (SGSN) 161 and a Gateway GPRS Support Node (GGSN) 162, wherein the SGSN 161 is the key control node for packet routing and transfer, mobility management (e.g., attach/detach and location management), session management, logical link management, and authentication and charging functions, etc., and the GGSN 162 is responsible for Packet Data Protocol (PDP) address assignments and inter-working with external networks. The EPC subsystem 170 may comprise a Mobility Management Entity (MME) 171, which may be responsible for idle mode UE tracking, paging procedures, and attachment and activation processes. The EPC subsystem 170 may also comprise a Servicing Gateway (SGW) 172, which may be responsible for the routing and forwarding of data packets. The EPC subsystem 170 may also include a Packet data network Gateway (PGW) 173, which may be responsible for providing connectivity from the UE 110 to external networks. Both the SGSN 161 and the MME 171 may be in communications with Home Subscriber Server (HSS) 180 which may provide device identification information, an International Mobile Subscriber Identity (IMSI), etc. It should be appreciated that the EPC subsystem 170 may also comprise a S4-SGSN 175, thereby allowing the GERAN 130 or UTRAN 140 to be accessed when the GPRS subsystem 160 is replaced by the EPC subsystem 170. Additionally, the service network 120 may further include other functional entities, such as a Home Location Register (HLR) (not shown) which is a central database storing user-related and subscription-related information, and the invention is not limited thereto.

In 3GPP LTE Release 11, enhanced UE-specific search space (EUSS) is defined in EPDCCH set(s), which comprises either contiguous or distributed radio resources or physical resource block (PRB) pairs, for the scheduling of downlink or uplink data transmission dedicated to one or a group of UEs. EPDCCH set(s) is/are configured by radio resource control (RRC) or a higher layer and at most two EPDCCH sets can be configured in one subframe on the same carrier. However, there is no enhanced common search space (ECSS) for the scheduling of broadcast common message transmission in 3GPP LTE Release 11 EPDCCH design. To enable the stand-alone operation of EPDCCH without the support of PDCCH, an ECSS should be supported in 3GPP LTE Release 12 system or future releases.

In addition to EPDCCH set(s) configured by RRC or a higher layer for the support of EUSS, it is proposed in this invention that another EPDCCH set is defined for the support of ECSS and its location is determined through a predefined rule in the specification, or the signaling in a dynamic indicator channel. Here, the signaling in the indicator channel indicates the configuration of the EPDCCH set supporting ECSS. Further, this new channel is transmitted dynamically to support a dynamic resource allocation, and the transmission periodicity can be one subframe or a couple of subframes. Then, the configurations for the proposed EPDCCH set supporting the common search space vary with a periodicity of a single subframe or multiple subframes. Moreover, in order to reduce the introduced signaling overhead, the information bits in the new channel can't be too large since this indicator channel is transmitted frequently.

For convenience, the proposed dynamic indicator channel is named as an enhanced physical control format indicator channel (EPCFICH), considering the function of this new channel is quite similar to that of legacy physical control format indicator channel (PCFICH), which informs UEs the length of control region. Further, the proposed EPDCCH set supporting ECSS is named as a common EPDCCH set in the following paragraphs and the EPDCCH set(s) configured by RRC or a higher layer to support EUSS is/are called configured EPDCCH set(s). In addition, though a set of radio resources are reserved or predetermined for candidate control channels transmitted within the common EPDCCH set, the unused radio resources within the reserved radio resources can be used for the transmission of other channels or signals. The terminology used throughout this invention is an example to describe the proposed concepts and methods clearly, and doesn't limit its application in other systems.

Figure 2:
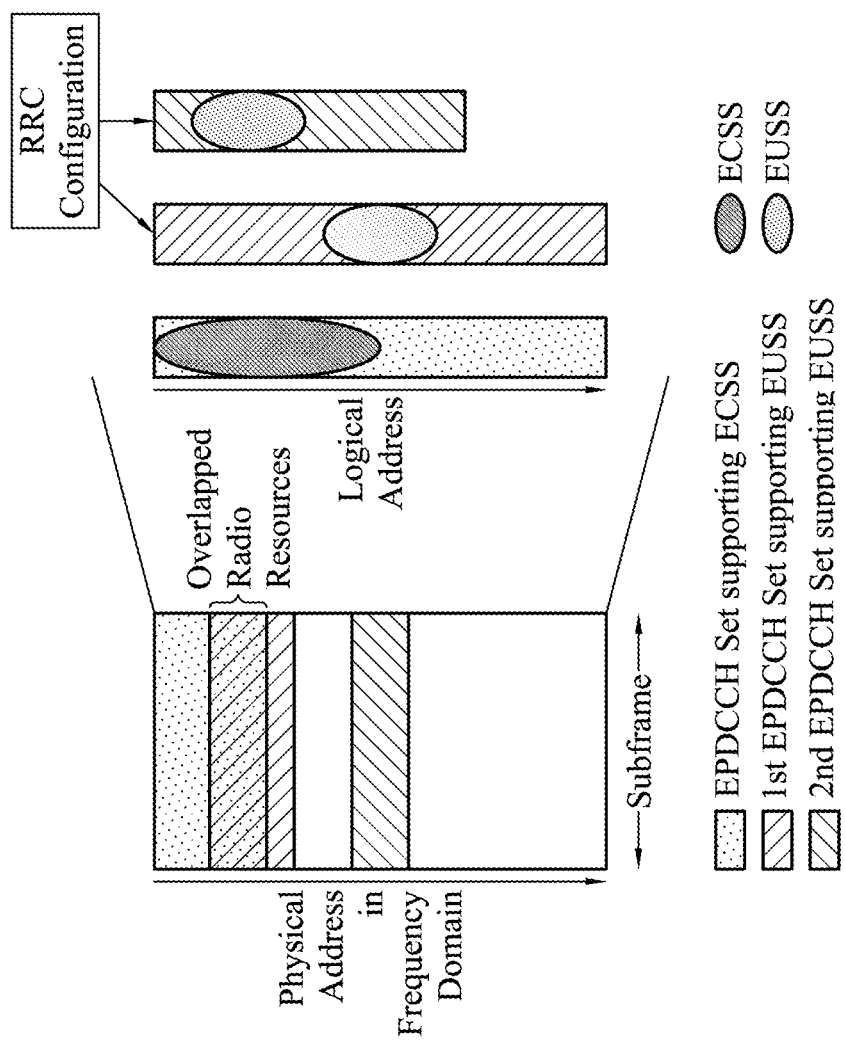
FIG. 2 is a schematic diagram illustrating an enhanced physical downlink control channel (EPDCCH) supporting an enhanced common search space (ECSS) and an enhanced UE-specific search space (EUSS) according to one embodiment of the present invention.

In one embodiment, only ECSS is supported in the common EPDCCH set by default and the configured EPDCCH set(s), which is/are not required to be mutually orthogonal to the radio resources of the common EPDCCH set supporting ECSS, is/are configured by RRC or a higher layer to support EUSS when or after the connection of RRC or a higher layer is established. In other words, the radio resources of the common EPDCCH set supporting ECSS can be mutually orthogonal to, partially or fully overlapped with the resources for the configured EPDCCH set(s) supporting EUSS. FIG. 2 illustrates a schematic diagram of the EPDCCH supporting the ECSS and EUSS according to one embodiment of the present invention. In FIG. 2, two configured EPDCCH sets supporting EUSS are named as the first and second EPDCCH sets supporting EUSS. Further, the radio resources for the two configured EPDCCH sets are orthogonal to the radio resources for the common EPDCCH set. The RRC or a higher layer configuration should be provided for UEs to monitor EUSS when or after RRC or a higher layer connection is established.

Figure 3:
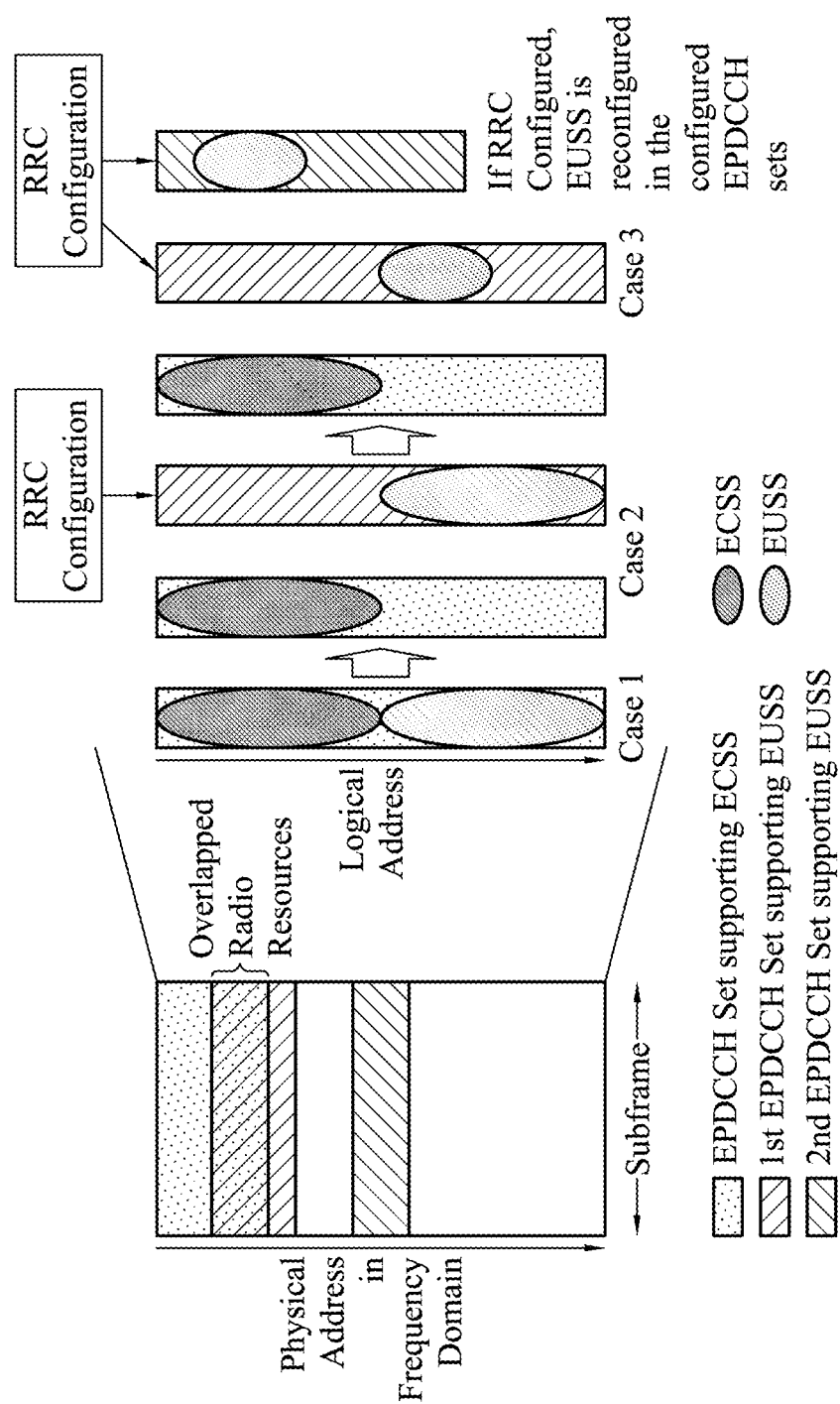
FIG. 3 is a schematic diagram illustrating the EPDCCH supporting the ECSS and the EUSS according to one embodiment of the present invention.
Figure 4:
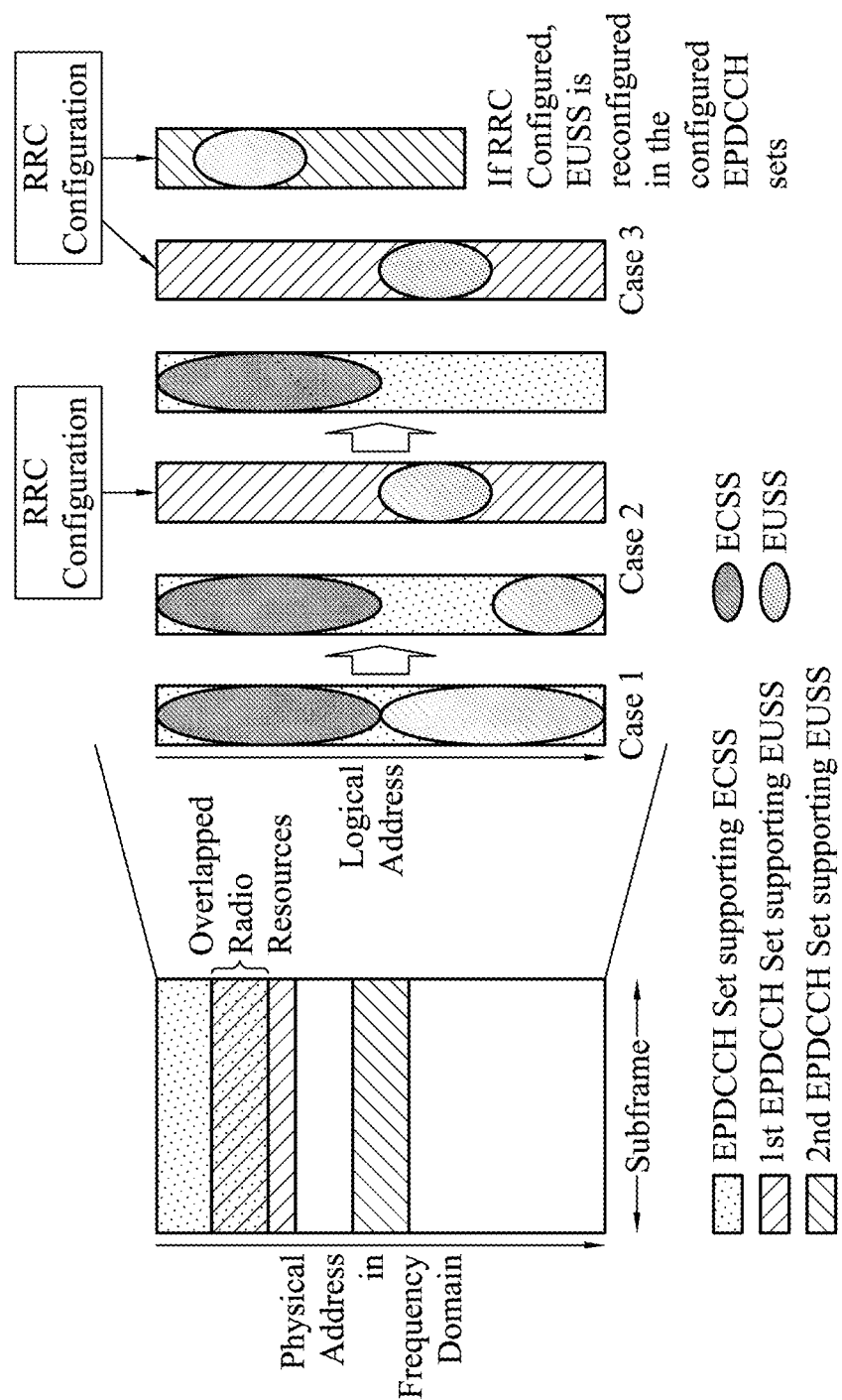
FIG. 4 is a schematic diagram illustrating the EPDCCH supporting the ECSS and the EUSS according to one embodiment of the present invention.

In another embodiment, the common EPDCCH set can support the ECSS by default without the RRC or higher layer configuration. If needed, another EPDCCH set(s) can be configured by the RRC or a higher layer to support EUSS. The EUSS can be supported only in the configured EPDCCH set(s) or in both the common and configured EPDCCH set(s) if a single configured EPDCCH set is configured by the RRC or a higher layer. The EUSS is supported only in the configured EPDCCH sets if two configured EPDCCH sets are configured by the RRC or a higher layer. FIG. 3 and FIG. 4 illustrate two schematic diagrams of the EPDCCH supporting the ECSS and the EUSS according to one embodiment of the present invention. In FIG. 3, both ECSS and EUSS are defined in the common EPDCCH by default (case 1 in FIG. 3). If there are EPDCCH set(s) configured by RRC or a higher layer, the EUSS for UEs to monitor is moved to the configured EPDCCH set(s) (case 2 and case 3 in FIG. 3). In FIG. 4, both ECSS and EUSS are defined in the common EPDCCH set by default (case 1 in FIG. 4). If there are two EPDCCH sets configured by RRC or a higher layer, the EUSS for UEs to monitor exists in the configured EPDCCH sets only (case 3 in FIG. 4). In case there is only one EPDCCH set configured by RRC or a higher layer, part of EUSS can be supported in the common EPDCCH set, while the other part is accommodated in the configured EPDCCH set (case 2 in FIG. 4). With this scheme, UE can utilize EUSS for unicast data reception or transmission directly without additional configuration signaling when or after RRC or higher layer connection is established. If needed, EUSS can be reconfigured in the newly configured EPDCCH set(s).

For UEs to receive and decode the common EPDCCH set supporting ECSS by default or without RRC/higher layer message, a predefined rule can be defined to determine a predefined set of radio resources for the common EPDCCH set supporting ECSS. The predefined rule is a function of cell ID to enable the cell planning for simple inter-cell interference coordination (ICIC). Here, the cell ID can be a physical cell ID or a virtual cell ID. To randomize the interference from the common EPDCCH set supporting ECSS to the neighboring cell, especially for a data channel, the predefined rule can further be a function of a subframe index, then the location of the common EPDCCH set can hop in the frequency domain every subframe or multiple subframes.

Another design option is to transmit the configuration of the common EPDCCH set by EPCFICH and the configuration can be changed with the periodicity of EPCFICH dynamically. The dynamic configuration can comprise the size of reserved radio resources, an offset value for inter-cell interference coordination or both. Here, the size of the reserved radio resources depends on the capacity of control signaling within the common EPDCCH set. The offset can be a physical frequency offset or a logical offset. In case of a physical offset, an offset based on PRB pairs is added to the reserved resources to support a PRB-level ICC. In case of a logical offset, an offset based on an enhanced control channel element (ECCE) or an enhanced resource element group (EREG) is performed to the search space within the common EPDCCH set. Then, an ECCE/EREG-level ICIC and an inter-cell search space randomization are supported. The indication in EPCFICH can also comprise the offset type.

Figure 5A:
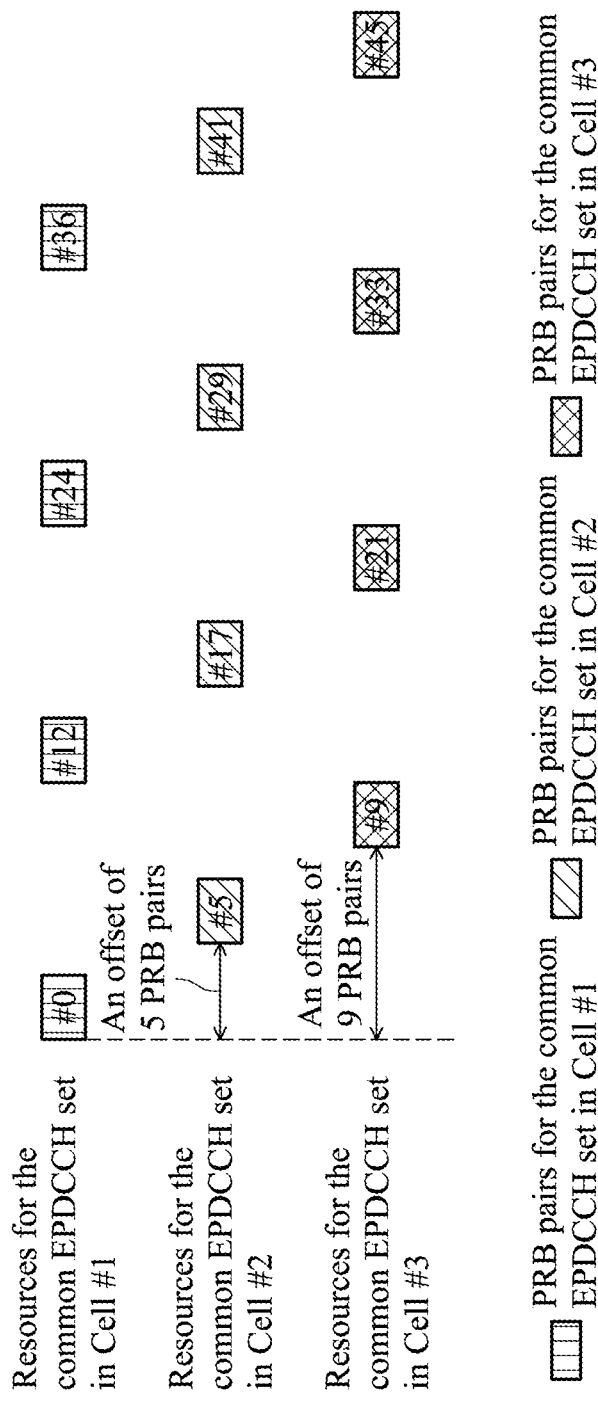
FIGS. 5A-5C are schematic diagrams illustrating the additional offset on different bases according to one embodiment of the present invention.
Figure 5B:
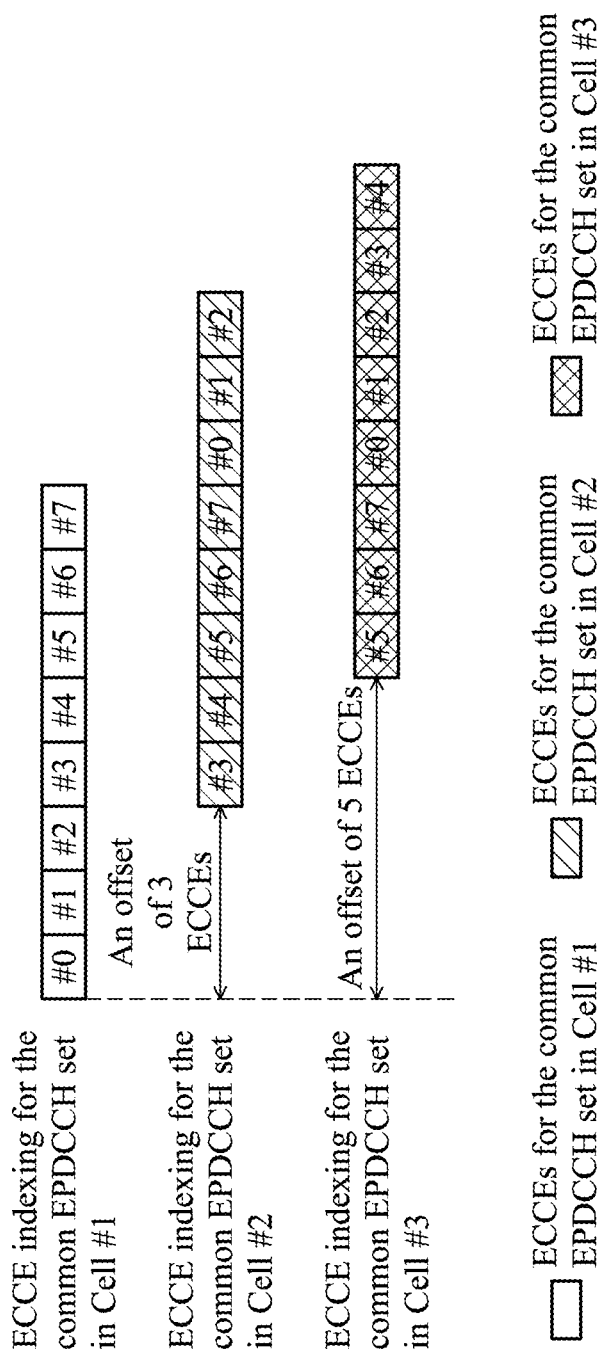
Figure 5C:
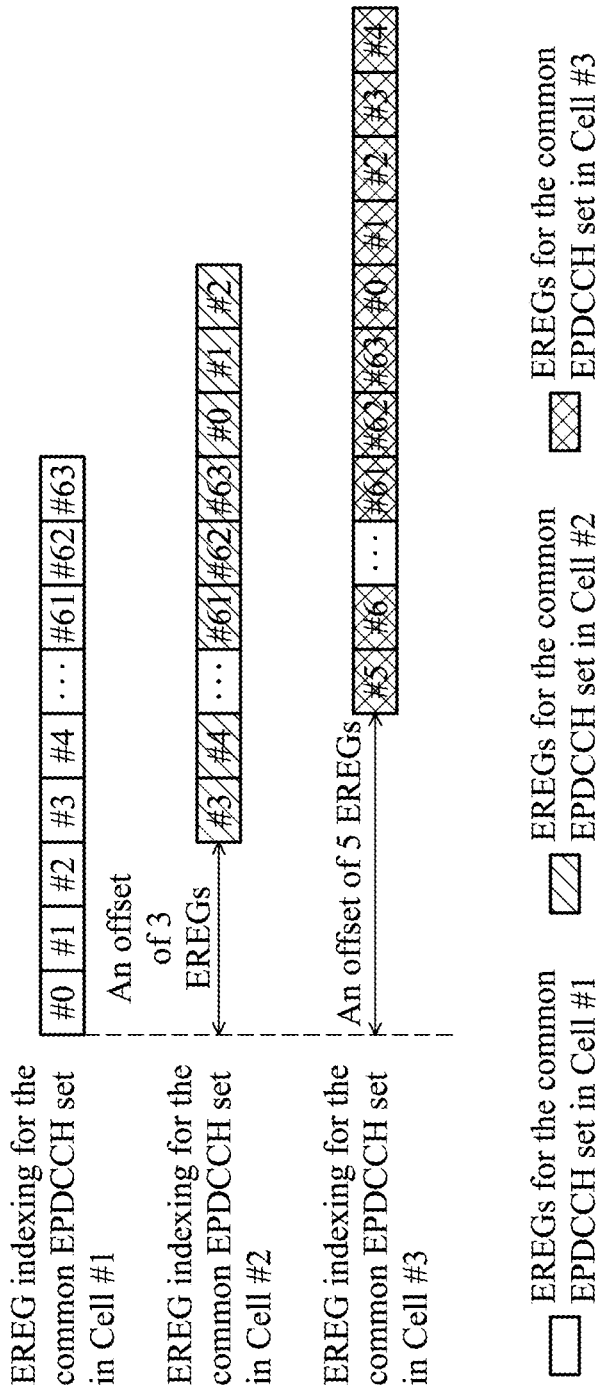

FIGS. 5A-5C are schematic diagrams illustrating the additional offset on different bases according to one embodiment of the present invention. In FIG. 5A, an offset on the level of PRB pair is added to the resources and reserved resources are mapped to different PRB pairs in each cell. Then, the candidate control channels within the common EPDCCH set are transmitted in different PRB pairs to support ICIC. In FIG. 5B and FIG. 5C, a logical offset is performed based on ECCE and EREG, respectively. Then, the starting ECCE/EREG indices of the search space in different cells are different from each other, though candidate channels are mapped to the same physical location.

Using such a method, it's possible to randomize the inter-cell interference and improve the resource reuse.

Figure 6A:
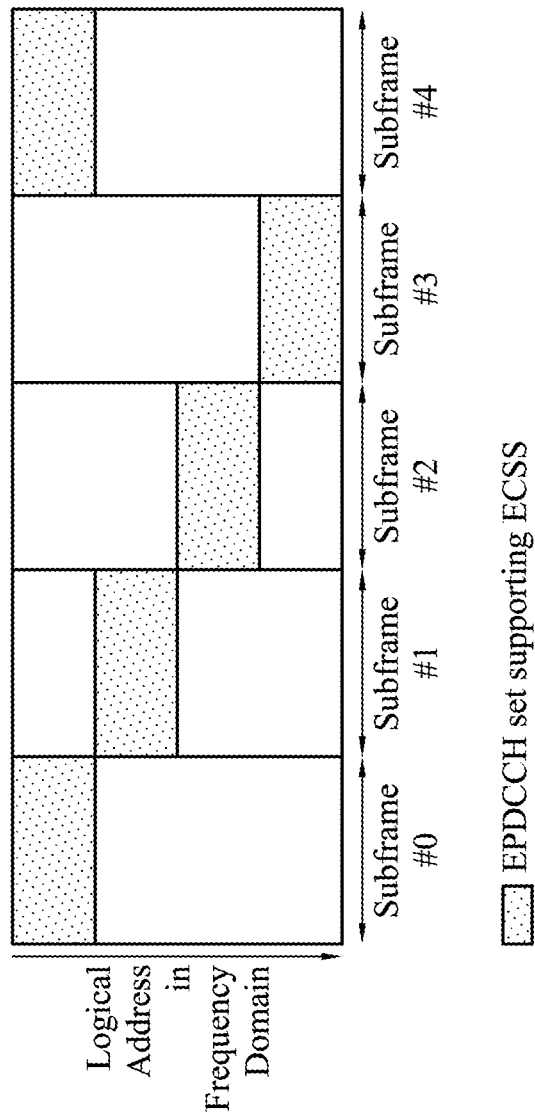
FIGS. 6A-6B are schematic diagrams illustrating the common EPDCCH set hopping in a frequency domain according to one embodiment of the present invention.
Figure 6B:
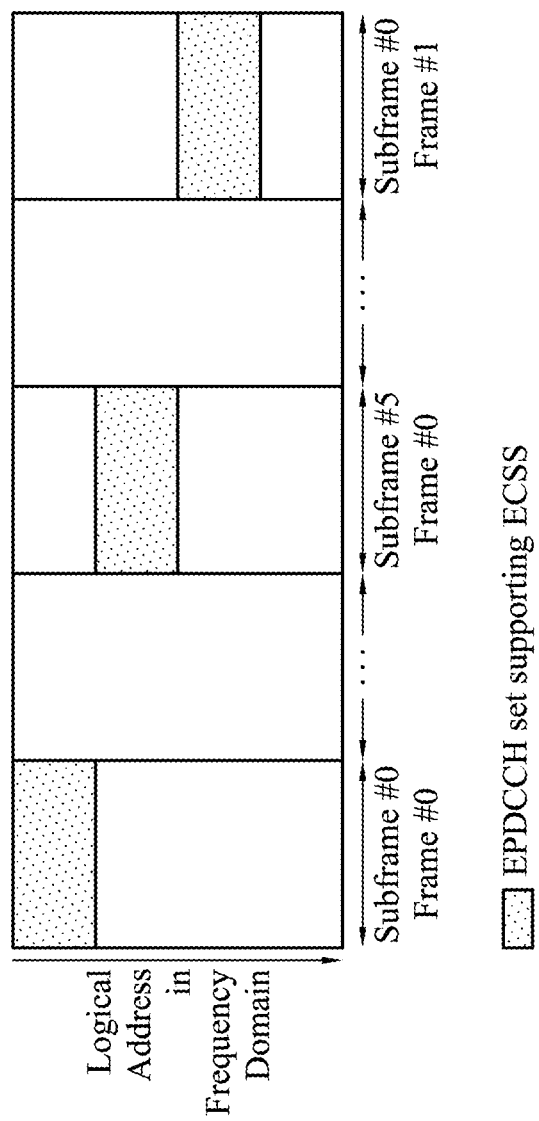

Even with the configuration signaling in EPCFICH, to randomize the interference from the transmission in the common EPDCCH set to the neighboring cells, especially for data channel, the time-frequency or logical location of radio resources for the common EPDCCH set can further change with the subframe index. In other words, the radio resource determination rule of the common EPDCCH set is a function of the subframe index. The diversity can be further guaranteed by this scheme as well. If the location changes with a couple of the subframes, the subframe index can be the index of one subframe within the periodicity. FIGS. 6A-6B are schematic diagrams illustrating the common EPDCCH set hopping in a frequency domain according to one embodiment of the present invention. The time-frequency or logical location of the common EPDCCH set can hop or change subframe by subframe in FIG. 6A. In FIG. 6B, the time-frequency or logical location of radio resources for the common EPDCCH set hops with a periodicity of 5 ms.

Additionally, to guarantee the performance, distributed transmission is applied to the common EPDCCH set and its radio resources can be distributed over the whole channel bandwidth evenly to maximize the diversity gain.

Based on the above discussions, to support stand-alone EPDCCH, a UE can determine the location of the common EPDCCH set by default. In other words, UEs can determine the size of reserved resources and the offset to the resources of the common EPDCCH set. For convenience, the size of reserved radio resources for the common EPDCCH set is expressed as the number of PRB pairs $N_{RB}^{ECSS}$, the offset is expressed as $N_{offset}^{ECSS}$, and the offset type is expressed as $T_{offset}$. Then, the main problem is how UEs determine the location of the common EPDCCH set, including the value of $N_{RB}^{ECSS}$, $N_{offset}^{ECSS}$ and the offset type.

In one embodiment (design option #1), the size of reserved radio resources can be signaled by EPCFICH. Then, the size of the resources can be dynamically changed according to the capacity of control channels. In another embodiment (design option #2), the size of reserved radio resources is fixed and only one value for the size is specified. Using such a method, no additional signaling will be introduced and UEs can determine the location of the common EPDCCH set quite easily when the offset value is known. In a third embodiment (design option #3), possible values are specified for the size of reserved radio resources. UEs perform blind detection within a possible set of radio resources by choosing one possible size from the value set. If candidate control channels are detected, i.e., CRC check is right, the size of radio resources can then be determined. Otherwise, UEs perform blind detection within another set of radio resources by selecting another size until the CRC check is right.

Figure 7D:
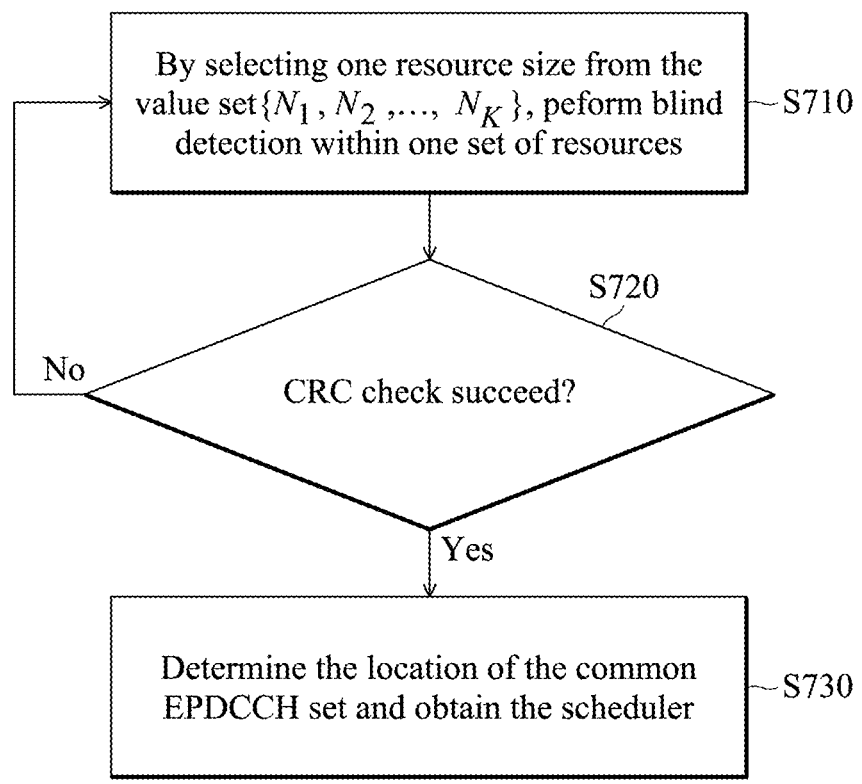

FIGS. 7A-7D are schematic diagrams illustrating four example for determining the size of resources for the common EPDCCH set according to one embodiment of the present invention. In FIG. 7A, an indicator with several bits in EPCFICH explicitly informs UEs the size of radio resources for the common EPDCCH set. An index of the resource size is transmitted in EPCFICH to indicate the resource size implicitly in FIG. 7B, where several possible values are indexed first. The size value is defined as one constant N in FIG. 7C. In FIG. 7D, in step S710, a set of possible values for the resource size is specified, $\{N_1, N_2, \ldots, N_K\}$, where $N_1 \leq N_2 \leq \ldots \leq N_K$. By choosing one size and obtaining one set of radio resources, UEs perform blind decoding within the resources. Then, in step S720 CRC check is processed. If CRC check is right, the resource can be determined (step S730). In step S730, The location of the common EPDCCH set is determined and the schedule is obtained Otherwise, UEs will try another value until the CRC check is right (return to step S710).

To reduce the complexity at UE side under design option #3, the blind decoding under different resource sizes can be different. Then, the total blind decoding times won't be very large. For example, less supported aggregation levels in case of a smaller size and this corresponds to less blind decoding attempts. In case of a larger size, more aggregation levels can be supported. Moreover, some rules can be defined to limit the possible values of resource size under different DL bandwidth, to further reduce the complexity. Such rule can also reduce the overhead under design option #1 and option #2.

Based on design option #3, some examples about rules to reduce the complexity are given in Table 1 and Table 2. In the examples, three possible values are specified for the resource size, $\{N_1, N_2, N_3\}$ and $N_1 < N_2 < N_3$. Further, three supported ECCE aggregation levels are defined as $\{L_1, L_2, L_3\}$ and $L_1 < L_2 < L_3$. In table 1, the candidate enhanced control number under different sizes and aggregation levels is summarized, where $O_m^n$ denotes the candidate enhanced control number under reserved resource size $N_n$ (n=1, 2, 3) and aggregation level $L_m$ (m=1, 2, 3). Unlike table 1, the relationship between resource size and downlink bandwidth are given in Table 2, where the rule is based on the defined LTE bandwidth. If the downlink bandwidth is not larger than 10 PRB pairs, only one value for the resource size is supported, i.e., $N_1$ is supported. If $10 < N_{RB}^{DL} \leq 50$, all possible values are applicable, and only $\{N_2, N_3\}$ are supported in other cases.

TABLE 1

Supported aggregation level and candidate number under different resource size

| Reserved resource size $N_{RB}^{ECSS}$ | Aggregation level | Number of EPDCCH candidates |
|---|---|---|
| $N_1$ | $\{L_1, L_2\}$ | $O_1^1 + O_2^1$ |
| $N_2$ | $\{L_1, L_2, L_3\}$ | $O_1^2 + O_2^2 + O_3^2$ |
| $N_3$ | $\{L_2, L_3\}$ | $O_2^3 + O_3^3$ |

TABLE 2

Supported aggregation level and candidate number under different resource size

| DL bandwidth | Reserved Resource size $N_{RB}^{ECSS}$ | Aggregation level | Number of EPDCCH candidates |
|---|---|---|---|
| $N_{RB}^{DL} \leq 10$ | $N_1$ | $\{L_1, L_2\}$ | $O_1^1 + O_2^1$ |
| $10 < N_{RB}^{DL} \leq 50$ | $N_1$ | $\{L_1, L_2\}$ | $O_1^1 + O_2^1$ |
|  | $N_2$ | $\{L_1, L_2, L_3\}$ | $O_1^2 + O_2^2 + O_3^2$ |
|  | $N_3$ | $\{L_2, L_3\}$ | $O_2^3 + O_3^3$ |
| $N_{RB}^{DL} > 50$ | $N_2$ | $\{L_1, L_2, L_3\}$ | $O_1^2 + O_2^2 + O_3^2$ |
|  | $N_3$ | $\{L_2, L_3\}$ | $O_2^3 + O_3^3$ |

For better frequency diversity, the radio resources of the common EPDCCH set are distributed over the whole channel bandwidth. To maximize the diversity gain, the reserved PRB pairs are further separated with a certain PRB pair interval. Here, the value of the PRB pair interval depends on the downlink channel bandwidth and the size of the reserved resources, and a maximum interval can be expressed as $\lfloor N_{RB}^{DL}/N_{RB}^{ECSS} \rfloor$. An example expression is given to allocate the reserved resources $$\text{Index of } n\text{th PRB pair} = n \times \lfloor N_{RB}^{DL}/N_{RB}^{ECSS} \rfloor, n=0, \ldots, N_{RB}^{ECSS}-1 \quad \text{Eq. (1)}$$

where $N_{RB}^{DL}$ is the PRB pair number of the downlink channel bandwidth. After the offset is added, the reserved resources can be determined by $$\text{Index of } n\text{th PRB pair} = (n \times \lfloor N_{RB}^{DL}/N_{RB}^{ECSS} \rfloor + N_{offset}^{ECSS}) \bmod N_{RB}^{DL}, n=0, \ldots, N_{RB}^{ECSS}-1 \quad \text{Eq. (2)}$$

where $N_{offset}^{ECSS}$ is a physical offset based on the PRB pair. If a logical offset is added, the search space is determined by adding the logical offset, after determining the physical resources according to Eq. (1)

To determine the offset value, there are three possible solutions to indicate $N_{offset}^{ECSS}$. Option 1 is to indicate the offset by an indicator in EPCFICH explicitly. It means the offset value is obtained from the indicator directly. Option 2 is to indicate the offset value by an indicator in EPCFICH implicitly, where the offset value is derived from the content of the indicator. Option #3 is to specify a rule to calculate the offset. In option 3, if the offset is on the basis of PRB pair, the size of the common EPDCCH set and the downlink channel bandwidth are the parameters to calculate the offset definitely, since the value range of the offset varies with the configuration of these two parameters. If the offset is on the basis of EREG or ECCE, except for the size of the radio resources of the common EPDCCH set, the EREG number per ECCE and the ECCE number per PRB pair should be taken into account, where the PRB pair is from the reserved resources for the common EPDCCH set. Further, the cell-specific parameters should be included, such as cell ID. The main considerations to support an ECCE/EREG-level offset are discussed in [0049]. Here, the cell ID could be the physical cell ID or a virtual cell ID. Moreover, the subframe index could also be considered to enable the location of the common EPDCCH set hop in the frequency domain with a certain periodicity, to maximize the diversity gain, randomize inter-cell interference and support the operation of ICIC. Obviously, no additional signaling will be introduced under such design options.

Some example expressions to calculate the offset on the basis of PRB pair, ECCE and EREG are given as follows:

$$\begin{cases} N_{offset}^{ECSS} = (N_{ID}^{cell} + n_{sf}) \bmod \lfloor N_{RB}^{DL}/N_{RB}^{ECSS} \rfloor, \text{PRBpairlevel} \\ N_{offset}^{ECSS} = (N_{ID}^{cell} + n_{sf}) \bmod (N_{RB}^{ECSS} * N_{RB}^{ECCE}), \text{ECCE level} \\ N_{offset}^{ECSS} = (N_{ID}^{cell} + n_{sf}) \bmod (N_{RB}^{ECSS} * N_{RB}^{EREG}), \text{EREG level} \end{cases} \quad \text{Eq. (3)}$$

where $n_{ID}^{cell}$ is the cell ID, $n_{sf}$ is the subframe index, $N_{RB}^{ECCE}$ is the ECCE number per PRB pair and $N_{RB}^{EREG}$ is the EREG number per PRB pair. Based on this example, an expression to determine the reserved resources with a basis of PRB pair can be obtained as follows:

$$\text{Index of } n\text{th PRB pair} = (n \times \lfloor N_{RB}^{DL}/N_{RB}^{ECSS} \rfloor + (N_{ID}^{cell} + n_{sf}) \bmod \lfloor N_{RB}^{DL}/N_{RB}^{ECSS} \rfloor) \bmod N_{RB}^{DL} \quad \text{Eq. (4)}$$

Figures 8A, 8B, 8C:
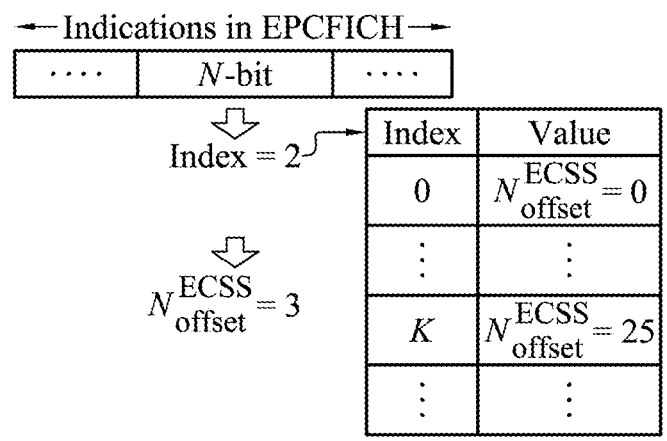
FIGS. 8A-8C are schematic diagrams illustrating three examples for determining the additional offset to the reserves radio resources for the common EPDCCH set according to one embodiment of the present invention.

FIGS. 8A-8C are schematic diagrams illustrating three examples for determining the additional offset to the reserves radio resources for the common EPDCCH set according to one embodiment of the present invention. In FIG. 8A, UEs obtain the offset value by decoding the indicator with L bits in EPCFICH directly. In FIG. 8B, an indicator with N bits in EPCFICH gives the index and UEs obtain the offset value by checking the index in a table, where a table determining the offset to the reserved radio resources for the common EPDCCH set is specified. Note that the offset value changes with the periodicity of EPCFICH under these two examples. In FIG. 8C, the offset value is calculated by a function of the size of reserved radio resources for the common EPDCCH set $N_{RB}^{ECSS}$, the downlink channel bandwidth $N_{RB}^{DL}$, the physical cell ID $N_{ID}^{cell}$ and the subframe index $n_{sf}$.

To support different kinds of offset, an indicator is introduced to inform UEs of the offset type $T_{offset}$. Such an indicator can be transmitted in EPCFICH to support a dynamic configuration of offset type. In another embodiment, the offset type is specified. For example, a rule is given that only a PRB-level offset is supported.

In this invention, one possible design direction (Direction #1) is proposed to support the stand-alone operation of EPDCCH, i.e., to support ECSS in the common EPDCCH set by default and without RRC or higher layer configuration. In Direction #1, UEs can obtain the location of the common EPDCCH set by a predefined rule. Under this direction, a rule should be specified and the physical location of the common set can be determined after the related parameters are known to UEs. Such a rule should specify how to obtain the size of reserved resources and the additional offset at the UE side. After determining the location of a data channel by decoding candidate control channels blindly within the common EPDCCH set, UEs could obtain the common control message, such as system information carried in a system information block (SIB). Therefore, design Direction #1 is also named as the predefined rule-based design method.

When determining the location of the common EPDCCH set under Direction #1, there are two options. Option #1 is one value is specified for the size of resources and the additional offset is calculated by a predefined function. Under such a design option, control channels in the common EPDCCH set are transmitted over a fixed size of resources. Unlike option #1, several possible values for the reserved resource sizes are specified and the size used is determined by blind detection in option #2. To reduce the complexity at the UE side, some rules should be predefined to limit the blind detection attempts under different resource sizes, the supported aggregation levels under different sizes and the supported resource sizes under different downlink channel bandwidths.

In option #1, the size of reserved radio resources is fixed and UEs determine the physical location of a common EPDCCH set after obtaining the offset by a predefined function. Then, the location of scheduled control information can be obtained by decoding candidate control channels. Finally, the common information is decoded. It can be seen that the location of the common EPDCCH set changes with the offset. The UE procedure can be summarized as follows:

Step 1: UEs determine the location of the common EPDCCH set according to the predefined rule.
Step 2: UEs perform blind detection within the common EPDCCH set and determine the location of SIB.
Step 3: UEs decode SIB at the corresponding location.
Continuation: UEs determine whether there is a new next periodicity of the configuration for the common EPDCCH set.
  Perform Step 2~Step 3 if there is no new periodicity of the configuration.
  Perform Step 1~Step 3 if there is a new periodicity of the configuration.

Figure 9:
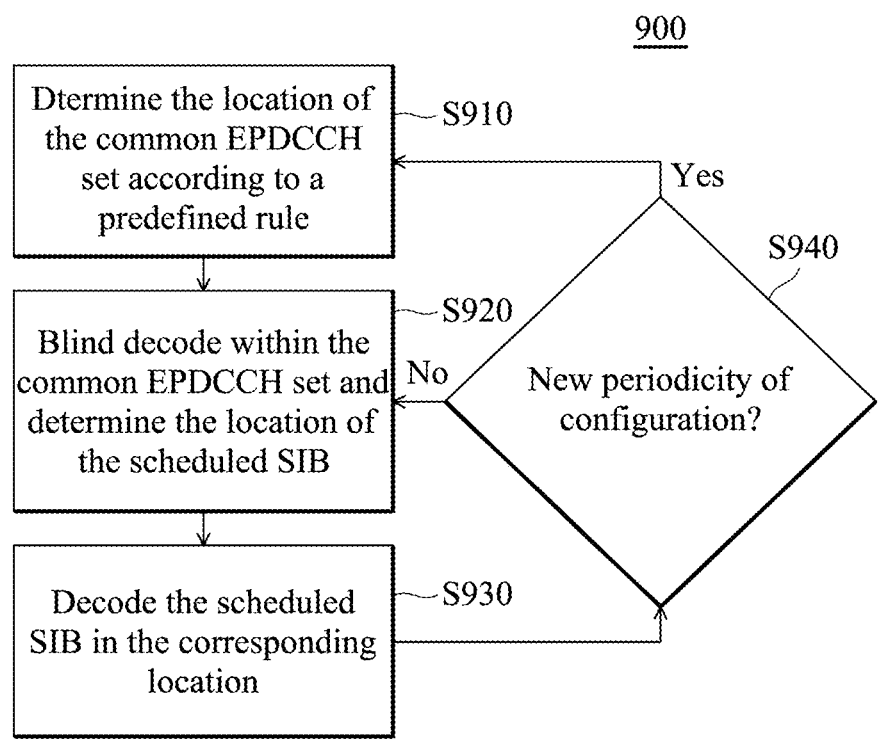
FIG. 9 is a flow diagram illustrating a method 900 of UE procedure for option #1 under design Direction #1 according to the embodiment of the present invention.

FIG. 9 is a flow diagram illustrating a method 900 of a UE procedure for option #1 under design Direction #1 according to the embodiment of the present invention. It is noted that the method is performed by the UE. First, in step S910, the UE determines the location of the common EPDCCH set according to the predefined rule. Then, in step S920, the UE performs blind detection within the common EPDCCH set and determine the location of SIB. In step S930, the UE decodes SIB at the corresponding location. In the step S940, the UE determines whether there is a new periodicity of the configuration for the common EPDCCH set. If there is no new periodicity of the configuration for the common EPDCCH set, the method returns to step S920. If there is a new periodicity of the configuration for the common EPDCCH set, the method returns to step S910. In an embodiment of the present invention, after step S920, the UE may perform the CRC check. If the CRC check fails, the method returns to step S910. If the CRC check succeeds, the method returns to step S930.

In option #2, by selecting one value from the specified set of resource sizes, UEs can obtain a set of radio resources for the common EPDCCH set through a predefined rule. If no candidate channels are detected by blind detection within the radio resources, i.e., the CRC check fails, it means that the selected size is not the real resource size and common control channels are not transmitted within the obtained location. UEs select another value and perform the same procedure until the CRC check succeeds. Then, the location of the scheduled SIB can be obtained by decoding the control channels, and the scheduled SIB information can be decoded consequently. The UE procedure under such design can be summarized as follows:

Step 1: UEs determine the location of the common EPDCCH set according to the predefined rule, by selecting one size value from the specified value set.
Step 2: UEs perform blind detection within the location determine the location of SIB and determine the location of SIB.
  Perform Step 1 if no candidate control channels are detected.
  Perform Step 3 if candidate control channels are detected.
Step 3: UEs decode SIB at the corresponding location from the decoded control channel.
Continuation: UEs determine whether there is a next periodicity of the configuration for the common EPDCCH set.
  Perform Step 2~Step 3 if there is no new periodicity of the configuration.
  Perform Step 1~Step 3 if there is a new periodicity of the configuration.

Figure 10:
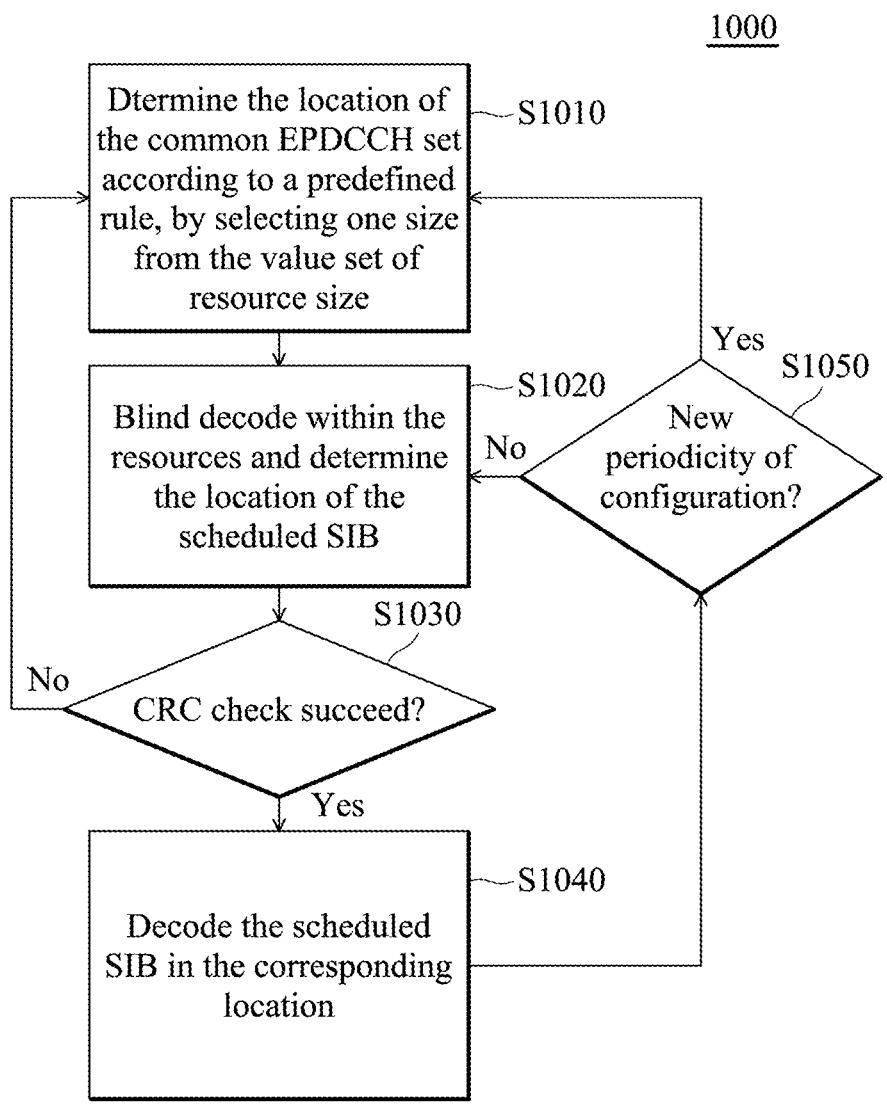
FIG. 10 is a flow diagram illustrating a method 1000 of UE procedure for option #2 under design Direction #1 according to the embodiment of the present invention.

FIG. 10 is a flow diagram illustrating a method 1000 of UE procedure for option #2 under design Direction #1 according to the embodiment of the present invention. It is noted that the method is performed by UE. First, in step S1010, the UE determines the location of the common EPDCCH set according to the predefined rule, by selecting one size value from the specified value set. Then, in step S1020, UE performs blind detection within the location and determines the location of SIB. In step S1030, UE performs the CRC check. If the CRC check fails, the method returns to step S1010. If the CRC check succeeds, it means UE obtains the resources for the common EPDCCH set and the scheduling information for broadcast message is obtained, correspondingly the method performs step S1040. In step S1040, the UE decodes the scheduled SIB in the corresponding location from the decoded control information. In step S1050, the UE determines whether there is a new periodicity of the configuration for the common EPDCCH set. If there is no new periodicity of the configuration for the common EPDCCH set, the method returns to step S1020. If there is a new periodicity of the configuration for the common EPDCCH set, the method returns to step S1010.

Under Direction #1, if there is a configured EPDCCH set(s) for some UEs, these UEs should also perform blind decoding within the configured EPDCCH set(s), as well as the common EPDCCH set. After determining the location of the UE-specific scheduling information by decoding the scheduler blindly in the configured EPDCCH set(s), UEs should decode the UE-specific information within the data region. If there is no configured EPDCCH set(s) for some UEs, these UEs just perform blind detection in the common EPDCCH set and perform the corresponding procedures.

Another design direction (Direction #2) is to signal the radio resources of the common EPDCCH set by EPCFICH. Under this direction, the configuration information in EPCFICH comprises the size of reserved radio resources, the additional offset to the reserved resources, the offset type, or several of them, explicitly or implicitly. Note that the transmission periodicity of EPCFICH under this design direction is on the basis of a single subframe, or a couple of subframes. Therefore, design direction #2 could also be named the EPCFICH based design method.

Under Direction #2, UEs first determine the reserved radio resources for the common EPDCCH set by decoding EPCFICH within the resources for EPCFICH. Then, UEs can determine the location of SIB by decoding the scheduler blindly in the common EPDCCH set. Finally, the scheduled SIB can be decoded in the corresponding position. Note that the configurations for the common EPDCCH set change with the transmission periodicity of EPCFICH. Then, the UE procedure under the design direction #2 could be summarized as follows:

Step 1: UEs receive EPCFICH indicating the radio resources for the common EPDCCH set.
Step 2: UEs determine the reserved radio resources of the common EPDCCH set by decoding EPCFICH.
Step 3: UEs perform blind decoding within the common EPDCCH set and determine the location of SIB by decoding the scheduling information for SIB.
Step 4: UEs decode the scheduled SIB.
Continuation: UEs determine whether there is a next periodicity of EPCFICH.
  Perform Step 1~Step 4 if there is a new periodicity of EPCFICH;
  Perform Step 2~Step 4 if there is no new periodicity of EPCFICH.

Figure 11:
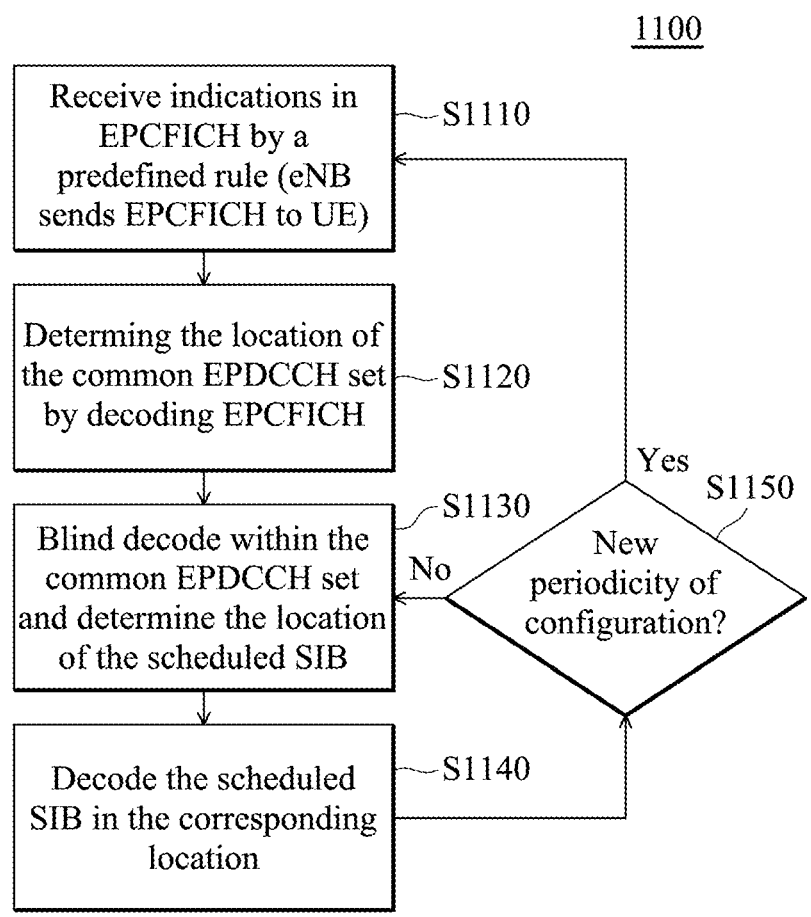
FIG. 11 is a flow diagram illustrating a method 1100 of procedures under the EPCFICH according to one embodiment of the present invention.

FIG. 11 is a flow diagram illustrating a method 1100 of procedures under the EPCFICH according to one embodiment of the present invention. It is noted that the method is performed by UE. First, in step S1110, the UE receives EPCFICH indicating the radio resources for the common EPDCCH set. Then, in step S1120, the UE determines the reserved radio resources of the common EPDCCH set by decoding EPCFICH. In step S1130, the UE performs blind decoding within the common EPDCCH set and determine the location of SIB by decoding the scheduling information for SIB. In step S1140, the UE decodes the scheduled SIB in the corresponding location. In the step S1150, the UE determines whether there is a new periodicity of EPCFICH. If there is no new periodicity of EPCFICH, the method returns to step S1130. If there is a new periodicity of EPCFICH, the method returns to step S1110.

Note that in case there are any configured EPDCCH sets for some UEs, these UEs should also perform blind decoding within the configured EPDCCH set(s), as well as the common EPDCCH set. After determining the location of the UE-specific scheduling information by decoding the scheduler blindly in the configured EPDCCH set(s), UEs should decode the UE-specific information within the data region. If there is no configured EPDCCH set(s) for some UEs, these UEs just perform blind detection in the common EPDCCH set and perform the corresponding procedures.

Under Direction#2, one issue is how UEs determine the location of EPCFICH. In this invention, it's proposed that a set of radio resources is reserved for EPCFICH transmission. Moreover, the resources for EPCFICH can be separated from, or fully or partially overlap with the resources of the common EPDCCH set. The size of radio resources can be on the basis of PRB pair, ECCE, EREG or RE, considering the overhead in EPCFICH. In addition, to reduce the complexity, it's proposed that resource size of EPCFICH is specified. To guarantee performance, distributed transmission is applied. As discussed above, EPCFICH is transmitted dynamically every subframe or every multiple subframes to support a dynamic resource allocation for the common EPDCCH set.

Two options are considered to transmit EPCFICH. In one embodiment (Option #1), the location of EPCFICH is fixed. For example, EPCFICH is always transmitted at the edges of downlink (DL) channel bandwidth. Here, the DL bandwidth can be known to UEs when decoding EPCFICH. A revised for method is UEs to decode EPCFICH assuming the DL bandwidth is 6 PRB pairs, i.e., EPCFICH is transmitted at the edge of six central PRB pairs. One issue is PSS/SSS and MIB are transmitted over the central PRB pairs in legacy LTE systems. The resources for EPCFICH should not collide with the synchronization signal and broadcast channel transmitting MIB, if there is a PBCH like broadcast channel in NCT and this channel is also transmitted over the six central PRB pairs. In another embodiment (Option #2), the radio resources for EPCFICH are distributed over the full band to maximize the diversity gain. Under this design, a rule can be defined for UEs to determine the physical location of EPCFICH. In order to support a simple ICIC, cell ID can be considered as one parameter, where the cell ID can be physical cell ID or virtual cell ID. Further, a subframe index can also be introduced to enable the location of EPCFICH hop in frequency domain with time.

Figure 12:
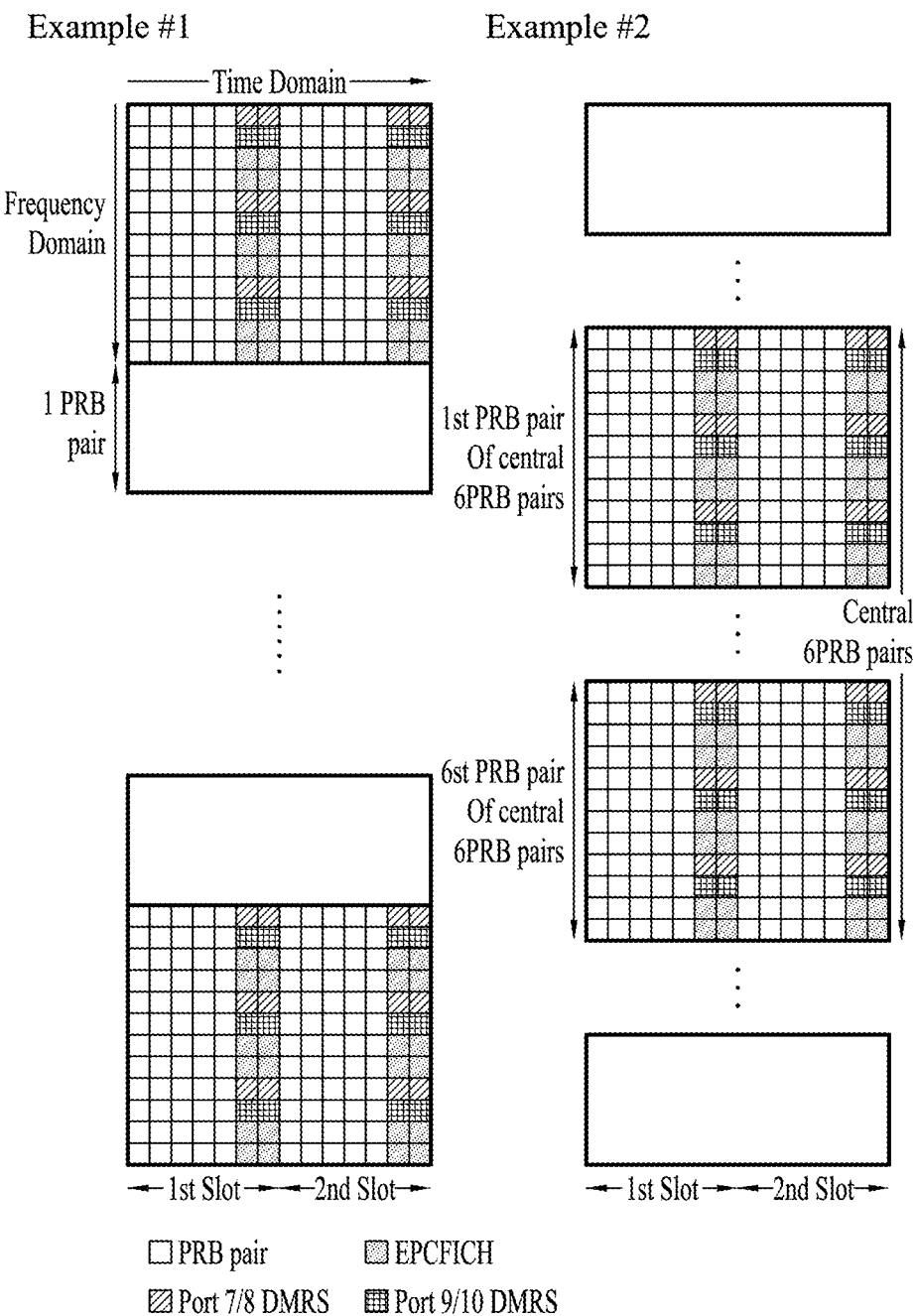
FIG. 12 is a schematic diagram illustrating examples of determining the location of EPCFICH according to one embodiment of the present invention.

FIG. 12 is a schematic diagram illustrating examples of determining the location of EPCFICH according to one embodiment of the present invention. In FIG. 12, some examples are illustrated. In Example #1, EPCFICH is transmitted over two PRB pairs, which are located at the edge of DL channel bandwidth, while EPCFICH is transmitted over the edge of central 6 PRB pairs of the whole DL channel bandwidth in case of Example #2. To guarantee performance, REs for EPCFICH are in the OFDM symbols where DMRS are located. Note that 48 REs are used for EPCFICH transmission in FIG. 12.

Figure 13:
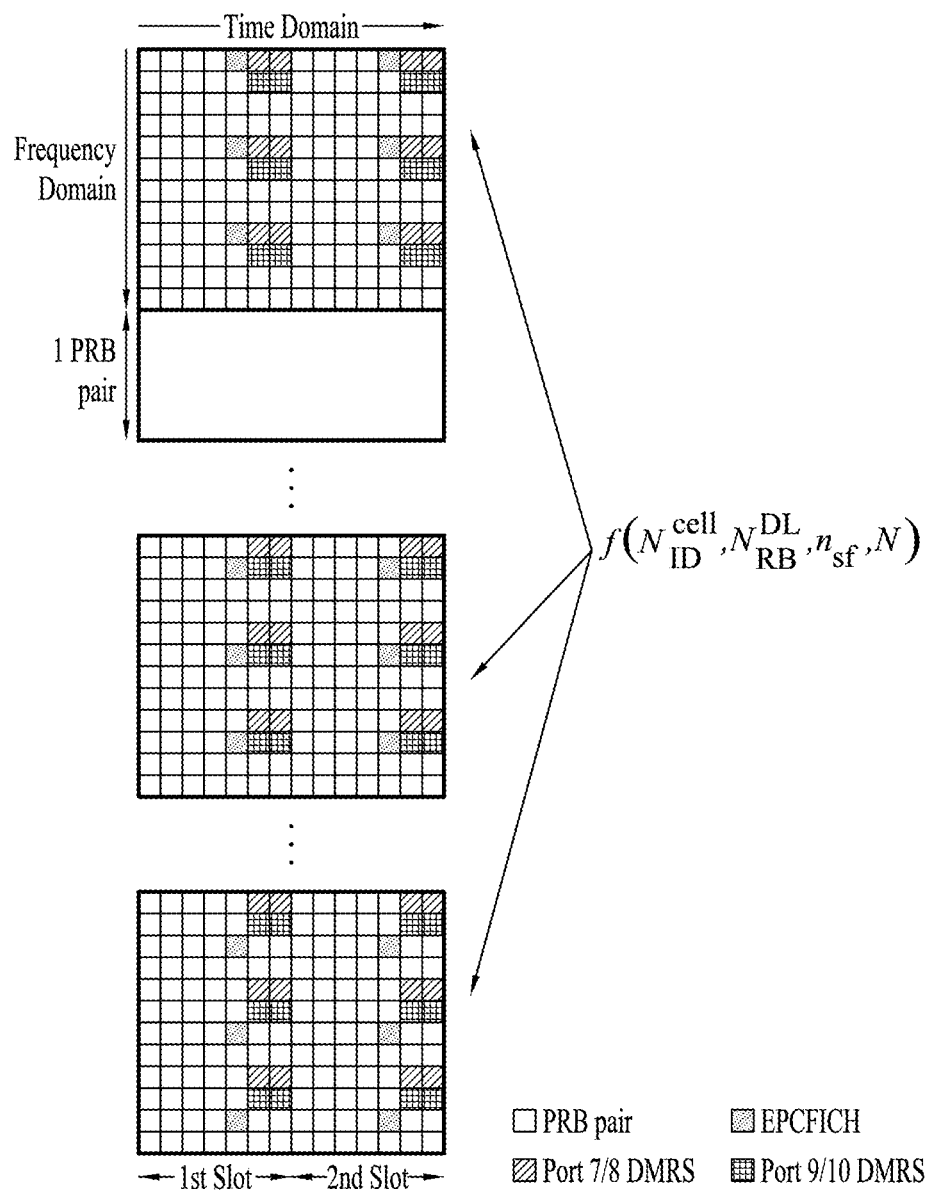
FIG. 13 is a schematic diagram illustrating examples of determining the location of EPCFICH according to another embodiment of the present invention.

FIG. 13 is a schematic diagram illustrating examples of determining the location of EPCFICH according to another embodiment of the present invention. An example is shown in FIG. 13, where a function is given to determine the resources for EPCFICH. In the function, cell ID $N_{ID}^{cell}$, DL bandwidth $N_{RB}^{DL}$, subframe index $n_{sf}$ and the resource size of EPCFICH N, are the parameters to determine the location of EPCFICH. Here, it's assumed that resource size of EPCFICH is specified as 18 Res.

According to the above discussion, by combining the possible solutions to indicate the location of the common EPDCCH set using the predefined rule-based method, or using the EPCFICH-based method, there are four possible methods under the proposed two design methods to indicate the size of reserved radio resources for the common EPDCCH set, the additional offset to the reserved radio resources for the common EPDCCH set, the type of additional offset, the location of EPCFICH under Direction #2, by considering the complexity at transmitter and receiver end, and the signaling overhead.

In Method #1 (based on a predefined rule), the size of the reserved radio resources for the common EPDCCH set is fixed and the offset is calculated by a predefined function.

In Method #2 (based on a predefined rule), several values are defined for the size of reserved radio resources and UEs perform blind detection within different sets of resources to determine the location of the common EPDCCH set. A predefined rule is used to obtain the additional offset value.

In Method #3 (based on EPCFICH), an indicator with a certain number of bits in EPCFICH explicitly indicates the size of reserved radio resources for the common EPDCCH set. Further, an indicator in EPCFICH indicates the offset type. The additional offset for the common EPDCCH set is calculated by a predefined function.

In Method #4 (based on EPCFICH), an indicator with a certain number of bits in EPCFICH indicates the index of resource size for the common EPDCCH set. Here, resource sizes for the common EPDCCH set are indexed in a table. The additional offset is obtained from a predefined function and the offset type is indicated by EPCFICH.

Method #1 for the Indication of the Location of the Common EPDCCH Set Under a Predefined Rule-Based Design Direction In this proposed method, UEs determine the location of the common EPDCCH set by a predefined rule. One value is specified for the size of reserved resources for the common EPDCCH set. Furthermore, a function is defined to calculate the additional offset, which is added to the reserved resources. The following gives an example for one of the candidate detail designs To reduce the complexity, the size of reserved resources for ECSS transmission is specified as 4 PRB pairs. The main consideration is there are 576 REs in 4 RPB pairs, which is equal to 16 control channel elements (CCEs). In legacy PDCCH, 16 CCEs are reserved for the transmission of a common search space (CSS).

As discussed, an additional offset $N_{offset}^{ECSS}$ is added to the reserved radio resources on the basis of PRB pair, ECCE or EREG. In this method, the PRB pair based offset is considered. Then, the offset value depends on the bandwidth and the size of the reserved radio resources. Further, to support ICIC, the cell ID should be considered to have a cell-specific offset. Moreover, to enable the location of the common EPDCCH set hop once every subframe or once a couple of subframes, the physical location of the common EPDCCH changes with a certain periodicity. In this method, the offset to the reserved resources for the common EPDCCH set changes every subframe. One example to calculate the offset can be expressed as $$N_{offset}^{ECSS}=(N_{ID}^{cell}+n_{sf})\bmod \lfloor N_{RB}^{DL}/N_{RB}^{ECSS}\rfloor \qquad \text{Eq. (5)}$$

where $N_{ID}^{cell}$ is the physical cell ID, $n_{sf}$ is the subframe index, and $N_{RB}^{DL}$ is the downlink channel bandwidth. Then, UEs can determine the reserved radio resources by following the expression:

$$\text{Index of } n\text{th PRB pair}=(n\times \lfloor N_{RB}^{DL}/N_{RB}^{ECSS}\rfloor + (N_{ID}^{cell}+n_{sf})\bmod \lfloor N_{ID}^{cell}/N_{RB}^{ECSS}\rfloor)\bmod N_{RB}^{DL} \qquad \text{Eq. (6)}$$

where n=0, ... , $N_{RB}^{ECSS}-1$ ($N_{RB}^{ECSS}=4$)

Figure 14:
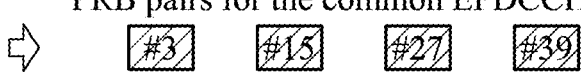
FIG. 14 is a schematic diagram illustrating an example of determining the location of the common EPDCCH set in cases where $N_{RB}^{DL}=50$ $N_{ID}^{cell}==3$ and $n_{sf}=0$ according to one embodiment of the present invention.

FIG. 14 is a schematic diagram illustrating an example of determining the location of the common EPDCCH set under the case of $N_{RB}^{DL}=50$, $N_{ID}^{cell}=3$ and $n_{sf}=0$ according to one embodiment of the present invention. In FIG. 14, UEs obtain the DL bandwidth, cell ID and subframe index first. Then, according to the designed function, the additional offset can be calculated. Finally, the location of the common EPDCCH set is determined by substituting related parameters in eq. (6).

Method #2 for the Indication of the Location of the Common EPDCCH Set Under a Predefined Rule-Based Design Direction In this proposed method, several values of the resource size of the common EPDCCH set are specified. Moreover, a function is defined to calculate the additional offset added to the reserved resources. Then, UEs perform blind detection to determine the size of reserved resources. The supported aggregation level under different resource sizes and the number of candidate control channels are also specified. The following gives an example for one of the candidate detail designs.

To reduce the complexity of blind decoding within ECSS, the possible values of $N_{RB}^{ECSS}$ are {2, 4, 8}. One consideration is there are 576 REs in 4 RPB pairs, which is equal to 16 control channel elements (CCEs). In legacy PDCCH, 16 CCEs are reserved for the transmission of the common search space (CSS). Considering the collision signals, such as CRS, CSI-RS, PSS/SSS and DMRS, the number of available REs within 4 PRB pairs will be less than 16 CCEs. Then, it's necessary to extend the search space. Therefore, $N_{RB}^{ECSS}=8$ is considered. Further, considering the complexity of blind decoding, a smaller size should be considered in case of a smaller ECSS. So, $N_{RB}^{ECSS}=2$ is proposed.

As discussed, an additional offset $N_{offset}^{ECSS}$ is added to the reserved radio resources on a basis of PRB pair, ECCE or EREG. The offset value depends on the bandwidth and the size of the reserved radio resources. Further, to support ICIC, the cell ID should be considered as having a cell-specific offset. Moreover, to enable the location of the common EPDCCH set hop once every subframe or once a couple of subframes, the physical location of the default EPDCCH changes with a certain periodicity. In this method, the offset to the reserved resources for the common EPDCCH set changes every subframe. One example to calculate the offset can be expressed as $$N_{offset}^{ECSS}=(N_{ID}^{cell}+n_{sf})\bmod \lfloor N_{RB}^{DL}/N_{RB}^{ECSS}\rfloor \qquad \text{Eq. (7)}$$

where $N_{ID}^{cell}$ is the physical cell ID, $n_{sf}$ is the subframe index, and $N_{RB}^{DL}$ is the downlink channel bandwidth. Then, UEs can determine the reserved radio resources by the following expression:

$$\text{Index of } n\text{th PRB pair}=(n\times \lfloor N_{RB}^{DL}/N_{RB}^{ECSS}\rfloor + (N_{ID}^{cell}+n_{sf})\bmod \lfloor N_{RB}^{DL}/N_{RB}^{ECSS}\rfloor)\bmod N_{RB}^{DL} \qquad \text{Eq. (8)}$$

where n=0, ... , $N_{RB}^{ECSS}-1$

To determine the location of the common EPDCCH set, blind detection is applied. By selecting one size from the value set {2, 4, 8}, UEs obtain a set of radio resources for the common EPDCCH set and perform blind detection within the resources. If the CRC check is right, it means the common EPDCCH set is transmitted over this set of resources. Otherwise, UEs will select another value and perform blind detection in another set of resources until the CRC check is right. To reduce the complexity at the UE side, the supported ECCE aggregation levels under different resource sizes are specified, as shown in Table 3. In the table, two cases are considered: case 1 corresponds to 4 ECCEs per PRB pair and 2 ECCEs per PRB pair under case 2, which is agreed for a UE-specific EPDCCH set in a 3GPP RAN1 session. To further reduce the complexity, some rules can be specified to limit the supported resource size under different DL bandwidth (expressed as PRB pair number), where the value set for DL bandwidth is {6, 15, 25, 50, 75, 100}. An example can be referenced to Table 4. In the table, it's specified that the possible values for $N_{RB}^{ECSS}$ are {2, 4} in case of $N_{RB}^{DL} \leq 10$; in case of $10 < N_{RB}^{DL} \leq 50$, the possible values for $N_{RB}^{ECSS}$ are {2, 4, 8}; otherwise, only 4 and 8 are supported.

eration is there are 576 REs in 4 RPB pairs, which is equal to 16 control channel elements (CCEs). In legacy PDCCH, 16 CCEs are reserved for the transmission of common search space (CSS). Considering the collision signals, such as CRS, CSI-RS, PSS/SSS and DMRS, the number of available REs within 4 PRB pairs will be less than 16 CCEs. Then, it's necessary to extend the search space. Therefore, $N_{RB}^{ECSS}=8$ is considered. Further, considering the complexity of blind decoding, a smaller size should be considered in case of a smaller ECSS. So, $N_{RB}^{ECSS}=2$ is proposed. Then, an example expression of reserved resources can be expressed as $$\text{Index of } n\text{th PRB pair} = (n \times \lfloor N_{RB}^{DL}/N_{RB}^{ECSS} \rfloor) \bmod N_{RB}^{DL} \quad \text{Eq. (9)}$$

where $n = 0, \ldots, N_{RB}^{ECSS} - 1$, and $N_{RB}^{DL}$ is the downlink channel bandwidth

TABLE 3

EPDCCH Candidate number

| Resource size | Aggregation level Case 1 | Aggregation level Case 2 | Number of EPDCCH Candidates for case 1 L = 4 | L = 8 | L = 16 | Number of EPDCCH Candidates for case 2 L = 2 | L = 4 | L = 8 | L = 16 |
|---|---|---|---|---|---|---|---|---|---|
| $N_{RB}^{ECSS} = 2$ | {4, 8} | {2, 4} | 2 | 1 | — | 2 | 1 | — | — |
| $N_{RB}^{ECSS} = 4$ | {4, 8, 16} | {2, 4, 8} | 4 | 2 | 1 | 4 | 2 | 1 | — |
| $N_{RB}^{ECSS} = 8$ | {4, 8, 16} | {4, 8, 16} | 8 | 4 | 2 | — | 4 | 2 | 1 |

TABLE 4

EPDCCH Candidate number

| DL BW | Resource size | Aggregation level Case 1 | Aggregation level Case 2 | Number of EPDCCH Candidates for case 1 L = 4 | L = 8 | L = 16 | Number of EPDCCH Candidates for case 2 L = 2 | L = 4 | L = 8 | L = 16 |
|---|---|---|---|---|---|---|---|---|---|---|
| $N_{RB}^{DL} \leq 10$ | $N_{RB}^{ECSS} = 2$ | {4, 8} | {2, 4} | 2 | 1 | — | 2 | 1 | — | — |
|  | $N_{RB}^{ECSS} = 4$ | {4, 8, 16} | {2, 4, 8} | 4 | 2 | 1 | 4 | 2 | 1 | — |
| $10 < N_{RB}^{DL} \leq 50$ | $N_{RB}^{ECSS} = 2$ | {4, 8} | {2, 4} | 2 | 1 | — | 2 | 1 | — | — |
|  | $N_{RB}^{ECSS} = 4$ | {4, 8, 16} | {2, 4, 8} | 4 | 2 | 1 | 4 | 2 | 1 | — |
|  | $N_{RB}^{ECSS} = 8$ | {4, 8, 16} | {4, 8, 16} | 8 | 4 | 2 | — | 4 | 2 | 1 |
| $N_{RB}^{DL} > 50$ | $N_{RB}^{ECSS} = 4$ | {4, 8, 16} | {2, 4, 8} | 4 | 2 | 1 | 4 | 2 | 1 | — |
|  | $N_{RB}^{ECSS} = 8$ | {4, 8, 16} | {4, 8, 16} | 8 | 4 | 2 | — | 4 | 2 | 1 |

Figure 15:
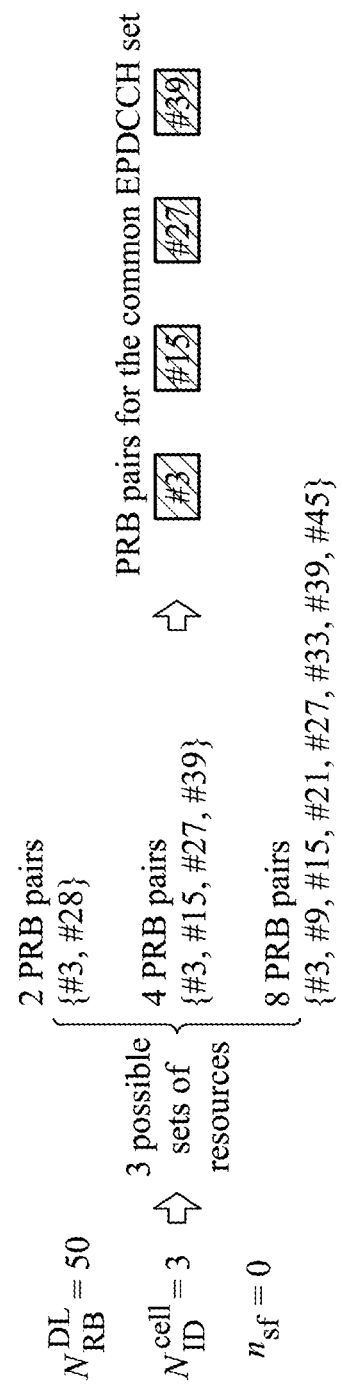
FIG. 15 is a schematic diagram illustrating an example of determining the location of the common EPDCCH set in cases where $N_{RB}^{DL}=50$, $N_{ID}^{cell}=3$ and $n_{sf}=0$ under the rule in Table 3 according to one embodiment of the present invention.

FIG. 15 is a schematic diagram illustrating an example of determining the location of the common EPDCCH set under the case of $N_{RB}^{DL}=50$, $N_{ID}^{cell}=3$ and $n_{sf}=0$ under the rule in Table 3 according to one embodiment of the present invention, where there is no specification on the supported resource sizes under different downlink channel bandwidth. In FIG. 15, UEs obtain the DL bandwidth, cell ID and subframe index first. Then, according to the predefined rule, 3 possible values for the resource size are tried within 3 sets of physical locations. The resource size is 4 in this example, so the CRC check is right when blind detection is performed within the reserved 4 PRB pair {3, 15, 27, 39}.

Method #3 for the Indication of the Location of the Common EPDCCH Set Under EPCFICH-Based Design Direction In this proposed method, an indicator in EPCFICH explicitly informs UEs the size of the reserved radio resources for the common EPDCCH set. The additional offset to the reserved resources is calculated by a predefined function. The following gives an example for one of the candidate detail designs.

To reduce the complexity of blind decoding within ECSS, the possible values of $N_{RB}^{ECSS}$ are {2, 4, 8}. One consid- As discussed, an additional offset $N_{offset}^{ECSS}$ is added to the reserved radio resources on a basis of PRB pair, ECCE or EREG. Obviously, the offset value depends on the bandwidth, the size of the reserved radio resources and the resource size. Further, to support ICIC, the cell ID should be considered as having a cell-specific offset. Moreover, to randomize the interference from the transmission of the common EPDCCH set, the logical address of the common EPDCCH set can further change with subframe index. In other words, the offset is a function of subframe index. If the offset changes with a couple of subframes, the index of one subframe within the periodicity can be used. In this method, the configuration cycle is one subframe. One example to calculate the offset on different bases can be expressed as $$\begin{cases} N_{offset}^{ECSS} = (N_{ID}^{cell} + n_{sf}) \bmod \lfloor N_{RB}^{DL}/N_{RB}^{ECSS} \rfloor, & PRB pair level \\ N_{offset}^{ECSS} = (N_{ID}^{cell} + n_{sf}) \bmod (N_{RB}^{ECSS} * N_{RB}^{ECCE}), & ECCE\ level \\ N_{offset}^{ECSS} = (N_{ID}^{cell} + n_{sf}) \bmod (N_{RB}^{ECSS} * N_{RB}^{EREG}), & EREG\ level \end{cases} \quad \text{Eq. (10)}$$

where $N_{ID}^{cell}$ is the physical cell ID, $n_{sf}$ is the subframe index, $N_{RB}^{ECCE}$ is the ECCE number per PRB pair, and $N_{RB}^{EREG}$ is the EREG number per PRB pair. The physical location of the common EPDCCH set won't change if a logical offset is performed. In case of a PRB-level offset, an expression to determine the reserved resources can be obtained as Index of $n$th PRB pair=$(n \times \lfloor N_{RB}^{DL}/N_{RB}^{ECSS} \rfloor + (N_{ID}^{cell}+n_{sf}) \bmod \lfloor N_{RB}^{DL}/N_{RB}^{ECSS} \rfloor) \bmod N_{RB}^{DL}$    Eq. (11)

To support a dynamic resource allocation for the common EPDCCH set, EPCFICH is introduced to indicate the resource size of the common EPDCCH set explicitly. Based on the proposed value for the resource size, the indicator format is given in Table 5.

TABLE 5

Indicator format for the resource size

| $N_{RB}^{ECSS}$ | Indicator format |
|---|---|
| 2 | {0, 0} |
| 4 | {0, 1} |
| 8 | {1, 0} |

Moreover, another indicator in EPCFICH is used to inform UEs the offset type dynamically, as shown in Table 6.

TABLE 6

Indicator format for the offset type

| Offset Type $T_{offset}$ | Indicator format |
|---|---|
| PRB-level | {0, 0} |
| ECCE-level | {0, 1} |
| EREG-level | {1, 0} |

EPCFICH can be transmitted in every subframe or with a periodicity of a couple of subframes. It should be noted that the periodicity of the additional offset can be different from that of EPCFICH, as long as the periodicity of EPCFICH is a multiple of the configuration cycle of additional offset to avoid the mismatch between the size and the offset. A transmission periodicity of 1 ms for EPCFICH is considered in this method, and the configuration cycle for the additional offset is also 1 ms.

In this method, distributed transmission is applied for EPCFICH. Further, EPCFICH location is fixed as the first and the last PRB pair of the downlink bandwidth. To guarantee the performance, REs for EPCFICH are distributed around DMRS in these two PRB pairs.

Figure 16:
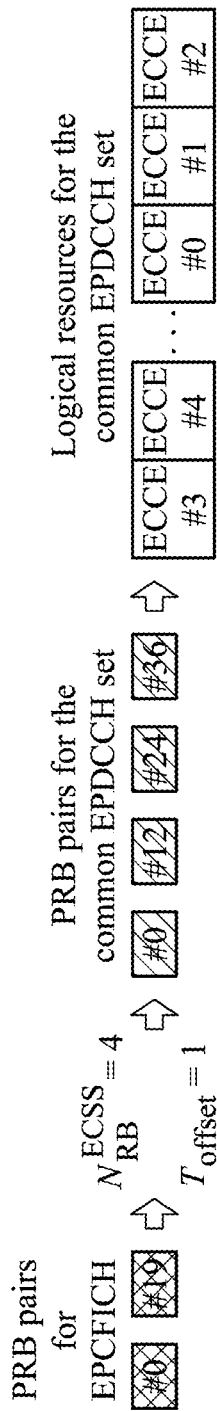
FIG. 16 is a schematic diagram illustrating an example of determining the location of the common EPDCCH set in cases where $N_{RB}^{DL}=50$, $N_{ID}^{cell}=3$ and $n_{sf}=0$ according to one embodiment of the present invention.

FIG. 16 is a schematic diagram illustrating an example of determining the location of the common EPDCCH set under the case of $N_{RB}^{DL}=50$, $N_{ID}^{cell}=3$ and $n_{sf}=0$ according to one embodiment of the present invention. In FIG. 16, UEs decode EPCFICH in PRB pair #0 and #49 after the downlink bandwidth is decoded as 50. From the configuration in EPCFICH, the physical location of the common EPDCCH set is determined. By substituting related parameters to the predefined function for the offset, an ECCE-level offset with 3 is obtained, since the information in EPCFICH indicates an ECCE-level offset. Therefore, the resources for the common EPDCCH set are regrouped and the initial ECCE index is ECCE #3.

Method #4 for the Indication of the Location of the Common EPDCCH Set Under EPCFICH Rule-Based Design Direction In this proposed method, different resource sizes of the common EPDCCH set are specified and indexed in a table.

An indicator in EPCFICH informs UEs of the index of the resource size. The additional offset to the reserved resources is calculated by a predefined function. The following gives an example for one of candidate detail designs.

To reduce the complexity of blind decoding within ECSS, the possible values of $N_{RB}^{ECSS}$ are {2, 4, 8}. One consideration is there are 576 REs in 4 RPB pairs, which is equal to 16 control channel elements (CCEs). In legacy PDCCH, 16 CCEs are reserved for the transmission of common search space (CSS). Considering the collision signals, such as CRS, CSI-RS, PSS/SSS and DMRS, the number of available REs within 4 PRB pairs will be less than 16 CCEs. Then, it's necessary to extend the search space. Just as current discussion in RAN1, 2 ECCEs per PRB pair would be applied under some conditions. Therefore, $N_{RB}^{ECSS}=8$ is considered. Further, considering the complexity of blind decoding, a smaller size should be considered in case of a smaller ECSS. So, $N_{RB}^{ECSS}=2$ is proposed. Then, an example expression of reserved resources can be expressed as Index of $n$th PRB pair=$(n \times \lfloor N_{RB}^{DL}/N_{RB}^{ECSS} \rfloor) \bmod N_{RB}^{DL}$    Eq. (11)

where $n=0, \ldots, N_{RB}^{ECSS}-1$, and $N_{RB}^{DL}$ is the downlink channel bandwidth.

As discussed, an additional offset $N_{offset}^{ECSS}$ is added to the reserved radio resources on a basis of PRB pair, ECCE or EREG. Obviously, the offset value depends on the bandwidth, the size of the reserved radio resources and the resource size. Further, to support ICIC, the cell ID should be considered to have a cell-specific offset. Moreover, to randomize the interference from the transmission of the common EPDCCH set, the logical address of the common EPDCCH set can further change with subframe index. In other words, the offset is a function of subframe index. If the offset changes with a couple of subframes, the index of one subframe within the periodicity can be used. In this method, the configuration cycle is one subframe. One example to calculate the offset on different bases can be expressed as $$\begin{cases} N_{offset}^{ECSS} = (N_{ID}^{cell} + n_{sf}) \bmod \lfloor N_{RB}^{DL}/N_{RB}^{ECSS} \rfloor, & PRBpairlevel \\ N_{offset}^{ECSS} = (N_{ID}^{cell} + n_{sf}) \bmod \lfloor N_{RB}^{ECSS} * N_{RB}^{ECCE} \rfloor, & ECCE\ level \\ N_{offset}^{ECSS} = (N_{ID}^{cell} + n_{sf}) \bmod \lfloor N_{RB}^{ECSS} * N_{RB}^{EREG} \rfloor, & EREG\ level \end{cases}$$    Eq. (12)

where $N_{ID}^{cell}$ is the physical cell ID, $n_{sf}$ is the subframe index, $N_{RB}^{ECCE}$ is the ECCE number per PRB pair, and $N_{RB}^{EREG}$ is the EREG number per PRB pair. The physical location of the common EPDCCH set won't change if a logical offset is performed. In case of a PRB-level offset, an expression to determine the reserved resources can be obtained as Index of $n$th PRB pair=$(n \times \lfloor N_{RB}^{DL}/N_{RB}^{ECSS} \rfloor + (N_{ID}^{cell}+n_{sf}) \bmod \lfloor N_{RB}^{DL}/N_{RB}^{ECSS} \rfloor) \bmod N_{RB}^{DL}$    Eq. (13)

To support a dynamic resource allocation for the common EPDCCH set, EPCFICH is introduced to indicate the resource size of the common EPDCCH set implicitly. Here, an index is transmitted in EPCFICH and one index corresponds to one size of resources. An example is given in Table 7.

TABLE 7

Indicator format for the resource size

| Index | Size value ($N_{RB}^{ECSS}$) | Indicator format |
|---|---|---|
| 0 | 8 | {0, 0} |
| 1 | 4 | {0, 1} |
| 2 | 2 | {1, 0} |

Moreover, another indicator in EPCFICH is used to inform UEs the offset type dynamically, as shown in Table 8.

TABLE 8

Indicator format for the offset type

| Offset Type $T_{offset}$ | Indicator format |
|---|---|
| PRB-level | {0, 0} |
| ECCE-level | {0, 1} |
| EREG-level | {1, 0} |

EPCFICH can be transmitted in every subframe or with a periodicity of a couple of subframes. It should be noted that the periodicity of the additional offset can be different from that of EPCFICH, as long as the periodicity of EPCFICH is a multiple of the configuration cycle of additional offset to avoid the mismatch between the size and the offset. A transmission periodicity of 1 ms for EPCICH is considered in this method, and the configuration cycle for the additional offset is also 1 ms.

In this method, distributed transmission is applied for EPCFICH. Further, EPCFICH is located at the first and the last PRB pair of central six PRB pairs. To guarantee the performance, REs for EPCFICH are distributed around DMRS in these two PRB pairs.

Figure 17:
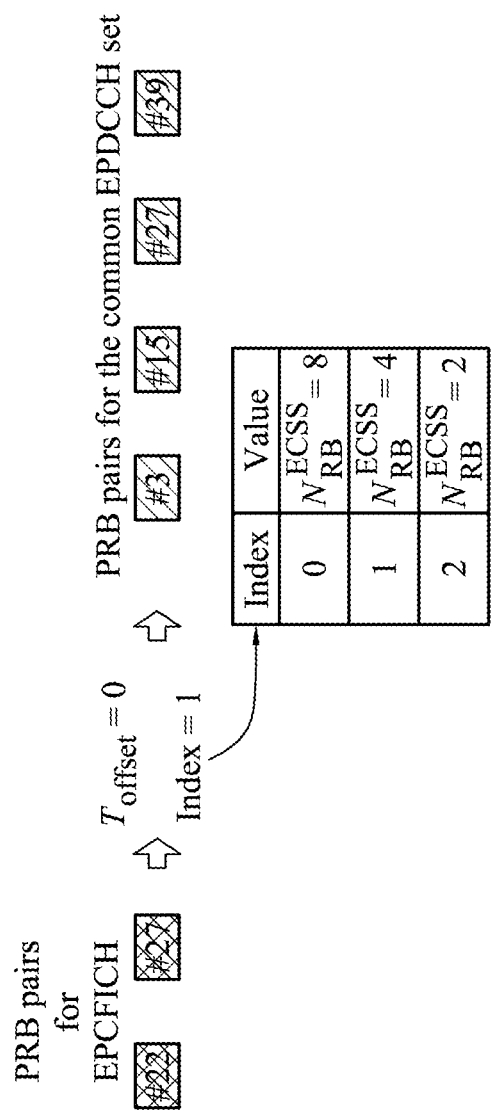
FIG. 17 is a schematic diagram illustrating an example of determining the location of the common EPDCCH set in cases where $N_{RB}^{DL}=50$ $N_{ID}^{cell}=3$ and $n_{sf}=0$ according to one embodiment of the present invention.

FIG. 17 is a schematic diagram illustrating an example of determining the location of the common EPDCCH set under the case of $N_{RB}^{DL}$=50, $N_{ID}^{cell}$=3 and $n_{sf}$=0 according to one embodiment of the present invention. In FIG. 17, UEs decode EPCFICH at PRB pair #22 and #27, which are the first and the last PRB pair of central six PRB pairs. From the configuration in EPCFICH, four PRB pairs are reserved for the common EPDCCH set and a PRB-level offset is added to the resources. By substituting related parameters to the predefined function, the physical location of the common EPDCCH set is determined.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways.

Those with skill in the art will further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for obtaining scheduling information of a data channel by a user equipment (UE), comprising:
  determining a first set of radio resources by decoding a dynamic indicator channel, wherein the dynamic indicator channel indicates a location of the first set of radio resources;
  decoding a physical control channel in the determined first set of radio resources; and
  obtaining scheduling information of the data channel that carries a message from the decoded physical control channel.

2. The method of claim 1, wherein the first set of radio resources includes candidate control channels that constitute an enhanced common search space.

3. The method of claim 1, wherein the first set of radio resources further includes candidate control channels that constitute an enhanced UE-specific search space.

4. The method of claim 1, wherein the dynamic indicator channel contains information of the size of the first set of radio resources.

5. The method of claim 1, wherein an offset value to the location of the first set of radio resources is further applied based on a predefined rule.

6. The method of claim 1, wherein the dynamic indicator channel contains an offset value to the location of the first set of radio resources.

7. The method of claim 6, wherein the offset is a physical offset; and the basic unit of the physical offset is a Physical Radio Block (PRB) pair.

8. The method of claim 6, wherein the offset is a logical offset; and the basic unit of the logical offset is an enhanced control channel element (ECCE) or an enhanced resource element group (EREG).

9. The method of claim 1, wherein the dynamic indicator channel includes an index for resource size in a table.

10. The method of claim 9, wherein the table defines the sizes of the first set of radio resources according to different index.

11. The method of claim 1, wherein the location of the first set of radio resources varies according to a predefined rule in every one or multiple subframes.

12. The method of claim 11, wherein the predefined rule is based on a function of a cell ID; and the cell ID is a physical cell ID or a virtual cell ID.

13. The method of claim 1, wherein the dynamic indicator channel is transmitted in every subframe or a couple of subframes.

14. The method of claim 1, further comprising:
receiving the dynamic indicator channel within a second set of radio resources.

15. The method of claim 14, wherein the second set of radio resources is orthogonal to the first set of radio resource; or the second set of radio resources overlaps with the first set of radio resource fully or partially.

16. The method of claim 14, wherein the second set of radio resources is fixed at the edge of a downlink channel bandwidth or the central of a downlink channel bandwidth.

17. An apparatus for obtaining scheduling information of a data channel, operating as User Equipment (UE), comprising:
an RF signal processing device, configured to receive a dynamic indicator channel; and
a processor, coupled to the RF signal processing device and configured to determine a first set of radio resources by decoding the dynamic indicator channel, wherein the dynamic indicator channel indicates a location of the first set of radio resources,
decoding a physical control channel in the determined first set of radio resources; and
obtaining scheduling information of the data channel that carries a message from the decoded physical control channel.

18. The apparatus of claim 17, wherein the first set of radio resources includes candidate control channels that constitute an enhanced common search space.

19. The apparatus of claim 17, wherein the first set of radio resources further includes candidate control channels that constitute an enhanced UE-specific search space.

20. The apparatus of claim 17, wherein the dynamic indicator channel contains information of the size of the first set of radio resources.

21. The apparatus of claim 17, wherein an offset value to the location of the first set of radio resources is further applied based on a predefined rule.

22. The apparatus of claim 17, wherein the dynamic indicator channel contains an offset value to the location of the first set of radio resources.

23. The apparatus of claim 22, wherein the offset is a physical offset; and the basic unit of the physical offset is a PRB pair.

24. The apparatus of claim 22, wherein the offset is a logical offset; and the basic unit of the logical offset is an enhanced control channel element (ECCE) or an enhanced resource element group (EREG).

25. The apparatus of claim 17, wherein the dynamic indicator channel includes an index for resource size in a table.

26. The apparatus of claim 24, wherein the table defines the sizes of the first set of radio resources according to different index.

27. The apparatus of claim 17, wherein the location of the first set of radio resources varies according to a predefined rule in every one or multiple subframes.

28. The apparatus of claim 27, wherein the predefined rule is based on a function of a cell ID; and the cell ID is a physical cell ID or a virtual cell ID.

29. The apparatus of claim 17, wherein the dynamic indicator channel is transmitted in every subframe or a couple of subframes.

30. The apparatus of claim 17, wherein the RF signal processing device receive the dynamic indicator channel within a second set of radio resources.

31. The apparatus of claim 30, wherein the second set of radio resources is orthogonal to the first set of radio resource; or the second set of radio resources overlaps with the set of radio resource fully or partially.

32. The apparatus of claim 30, wherein the second set of radio resources is fixed at the edge of a downlink channel bandwidth or the central of a downlink channel bandwidth.

* * * * *